(12) United States Patent
Lin

(10) Patent No.: US 8,718,448 B2
(45) Date of Patent: May 6, 2014

(54) VIDEO PICTURES PATTERN DETECTION

(75) Inventor: Ken Kengkuan Lin, Sunnyvale, CA (US)

(73) Assignee: Apple Inc., Cupertino, CA (US)

(*) Notice: Subject to any disclaimer, the term of this patent is extended or adjusted under 35 U.S.C. 154(b) by 111 days.

(21) Appl. No.: 13/101,125

(22) Filed: May 4, 2011

(65) Prior Publication Data

US 2012/0281971 A1  Nov. 8, 2012

(51) Int. Cl.
| | |
|---|---|
| *H04N 5/93* | (2006.01) |
| *H04N 5/00* | (2011.01) |
| *H04N 5/228* | (2006.01) |
| *H04N 5/765* | (2006.01) |
| *H04N 11/20* | (2006.01) |
| *H04B 1/66* | (2006.01) |

(52) U.S. Cl.
USPC ........ 386/284; 386/232; 348/222.1; 348/441; 348/443; 348/445; 348/448; 348/458; 348/459; 348/616; 348/619; 375/240

(58) Field of Classification Search
USPC ............... 386/284, 232, E5.003, E9.013; 348/222.1, 441, 443, 445, 448, 458, 348/459, 616, 69, E7.003, E7.015, 619; 375/240, E7.191, E7.211; G9B/27.012, G9B/27.051
See application file for complete search history.

(56) References Cited

U.S. PATENT DOCUMENTS

| | | | |
|---|---|---|---|
| 5,134,480 | A | 7/1992 | Wang et al. |
| 5,821,991 | A | 10/1998 | Kwok |
| 5,847,772 | A | 12/1998 | Wells |
| 5,929,902 | A | 7/1999 | Kwok |
| 6,115,499 | A | 9/2000 | Wang et al. |
| 6,385,240 | B2 * | 5/2002 | Nishio ................. 375/240 |
| 6,449,015 | B1 | 9/2002 | Sugaya |
| 6,525,774 | B1 | 2/2003 | Sugihara |
| 6,724,433 | B1 | 4/2004 | Lippman |

(Continued)

FOREIGN PATENT DOCUMENTS

| | | |
|---|---|---|
| EP | 0720371 | 7/1996 |
| EP | 2066124 | 6/2009 |
| WO | WO 95/15659 | 6/1995 |
| WO | WO 97/39577 | 10/1997 |

OTHER PUBLICATIONS

Portions of prosecution history of U.S. Appl. No. 10/826,784, Apr. 8, 2008, Lin, Ken K.

(Continued)

*Primary Examiner* — Daquan Zhao
*Assistant Examiner* — Syed Hasan
(74) *Attorney, Agent, or Firm* — Adeli LLP

(57) ABSTRACT

Some embodiments of the invention provide a media-editing application that performs frame rate conversion detection on a video. For a video that has been converted from one frame rate and format to another frame rate and format, the application detects the conversion method that has been used in the conversion of the video. Some embodiments perform this frame rate conversion detection by detecting patterns of repeating fields and/or frames in a video sequence created by the different conversion processes.

Some embodiments compute (i) a frame difference value for each consecutive frames, (ii) a correlation score for the first and second fields of each frame, and (iii) a correlation score for the second field of each frame and the first field of a succeeding frame. Frame difference values are compared with each other to detect repeated frames and correlation scores are compared with each other to detect repeated fields.

24 Claims, 23 Drawing Sheets

(56) References Cited

U.S. PATENT DOCUMENTS

| | | |
|---|---|---|
| 7,023,486 B2 | 4/2006 | Takayama |
| 7,133,064 B2 | 11/2006 | Lin |
| 7,154,555 B2 | 12/2006 | Conklin |
| 7,428,008 B2 * | 9/2008 | Okamoto et al. ........... 348/222.1 |
| 8,319,888 B2 * | 11/2012 | Elangovan et al. ........... 348/441 |
| 2004/0130619 A1 | 7/2004 | Lin |
| 2005/0001929 A1 * | 1/2005 | Ochial et al. ................. 348/448 |
| 2005/0231635 A1 | 10/2005 | Lin |
| 2008/0100745 A1 | 5/2008 | Matsubara |
| 2009/0273710 A1 * | 11/2009 | Pearlstein et al. ............ 348/459 |

OTHER PUBLICATIONS

Author Unknown, "What is Deinterlacing? Facts, solutions, examples," Month Unknown, 2002, http://www.100fps.com/index.htm.

* cited by examiner

VIDEO PICTURES PATTERN DETECTION

BACKGROUND

With the variety of devices available in today's market for capturing and playing videos, where each device supports capturing and/or playing videos at a different frame rate and format, videos are often stored at a frame rate and format that is different from the frame rate and format at which the videos are created or captured (i.e., the native frame rate and format). For example, many video capturing devices such as video camcorders store videos at 30 frames per second even though the videos are captured at 24 frames per second. Videos are also converted from one frame rate and format to another frame rate and format in order to be played by difference devices. For example, PAL televisions play interlaced videos at 50 fields per second (50i). On the other hand, NTSC televisions support playing interlaced videos at 60 fields per second (60i). Thus, for a movie that is captured at 24 frames per second to be played by one of these devices, the movie must first be converted to the different frame rate and format that is supported by the device.

Different frame rate conversion methods may be used to convert a video from one frame rate and format to another frame rate and format. Some conversion methods convert a video by repeating one or more frames or fields of the original video. In addition, some conversion methods interlace fields from different frames of the original video during the conversion process. Thus, a converted video may contain one or more repeated frames or fields from the original video. Also, a frame in the converted video may contain two fields that come from different frames in the original video.

When a video-editing application (e.g., Final Cut Pro®, iMovie®, etc.) receives a video from another device (such as a camera or a tape deck), it often converts the video back to the video's native frame rate and format before editing the video. As such, information about a video's native frame rate and format, and the conversion method used on the video (also known as encoding cadence) would be useful for a video-editing application. However, even though some video capturing devices (e.g., the Panasonic DVX100) embed the native frame rate information in each frame of the original video, the encoding cadence is often not recorded or lost during the frame rate conversion process.

Existing video-editing applications overcome this problem by using a variety of inefficient manual techniques for this conversion. For instance, some applications require their users to enter the encoding cadence manually. Some of these applications then have their users identify manually the first frame, while others use a timecode-technique that identifies the frames based on the embedded timecode. Requiring users to enter the encoding cadence is at times impractical, as the users might not know this information. Also, requiring the users to manually identify the first frame is inefficient since the user has to scroll through the video and identify the appropriate frame. In addition, the timecode-techniques for identifying the frame ID's can lead to inaccurate results when the timecode is not accurate. Therefore, it will be beneficial for a video-editing application to be able to automatically and accurately detect a video's native frame rate and the conversion method used on the video.

BRIEF SUMMARY

Some embodiments of the invention provide a media-editing application that performs frame rate conversion detection on a video. For a video that has been converted from one frame rate and format to another frame rate and format, the application detects the conversion method that has been used in the conversion of the video. Some embodiments perform this frame rate conversion detection in parallel upon import of the video file while other embodiments perform the frame rate conversion detection only when directed by a user.

In some embodiments, the media-editing application is an application that enables a user to create a composite media presentation from a set of media files. Through a graphical user interface (GUI) of the application, the user specifies the manner in which the media files are composited to create the composite presentation. In addition, through this GUI, the user can command the application to import one or more media files (e.g., from a camera, from an external drive, from an internal drive, etc.). When the imported media file is a video file, upon instructions from the user (i.e., through a user interface of the media-editing application) or as an automatic process during import of the video file, the application performs frame rate conversion detection on the video.

To perform frame rate conversion detection on an interlaced video, the application of some embodiments computes a correlation score for the first and second fields of each frame, and a correlation score for the second field of each frame and the first field of a succeeding frame in a group of consecutive frames. The correlation score for two different fields indicates how close the two fields fit in a frame (i.e., how well the two fields correlate with each other in a frame). In some embodiments, a smaller correlation score between two fields indicates that the two fields are closer fit together (i.e., correlate better with each other) in a frame and a larger correlation score indicates that the two fields are not as close fit with each other (i.e., do not correlate with each other well) in a frame. Some embodiments compute this correlation score by comparing an interpolated first field with the first field of the frame, and comparing an interpolated second field with the second field of the frame. In some embodiments, the interpolated first field is created through interpolation using the second field. Similarly, the interpolated second field is created through interpolation using the first field.

In addition, the application performs a series of comparisons between the correlation scores. In some embodiments, the application determines whether the correlation score between the second field of a first frame and the first field of a second frame is smaller than the correlation score between the first and second fields of the second frame, where the second frame immediately follows the first frame in a video sequence. The application also determines whether the correlation score between the second field of the second frame and the first field of a third frame is smaller than the correlation score between the first and second fields of the third frame, where the third frame immediately follows the second frame in the video sequence.

To perform frame rate conversion detection on a progressive video, the application of some embodiments computes a frame difference value for each pair of consecutive frames in a group of consecutive frames during the frame rate detection process. The frame difference value for a pair of consecutive frames quantifies an amount of differences between the two frames in the pair.

In addition, the application performs a series of comparisons between the frame difference values. Some embodiments identify a first pair of frames with the smallest frame difference value, a second pair of frames with the second smallest frame difference value, and a third pair of frames with the third smallest frame difference value in the group. The application of some embodiments determines whether the first pair of frames and the second pair of frames are apart from each other by a predetermined number of frames. The application also determines whether the frame difference value for the third pair of frames is larger than the frame difference value for the second pair of frames by a predetermined factor.

In some embodiments, within the group of consecutive frames, the application determines whether the frame difference value for a particular pair of consecutive frames is larger than the frame difference value for the preceding pair of consecutive frames. The application then determines whether the frame difference value for the particular pair of consecutive frames is larger than the frame difference value for the succeeding pair of consecutive frames. The application also determines whether the frame difference value for the particular pair of consecutive frames is larger than the frame difference value for the second succeeding pair of consecutive frames.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments of the invention provide a media-editing application that performs frame rate conversion detection on a video. For a video that has been converted from one frame rate and format to another frame rate and format, the application detects the conversion method that has been used in the conversion of the video. Some embodiments perform this frame rate conversion detection in parallel upon import of the video file while other embodiments perform the frame rate conversion detection only when directed by a user.

Figure 1:
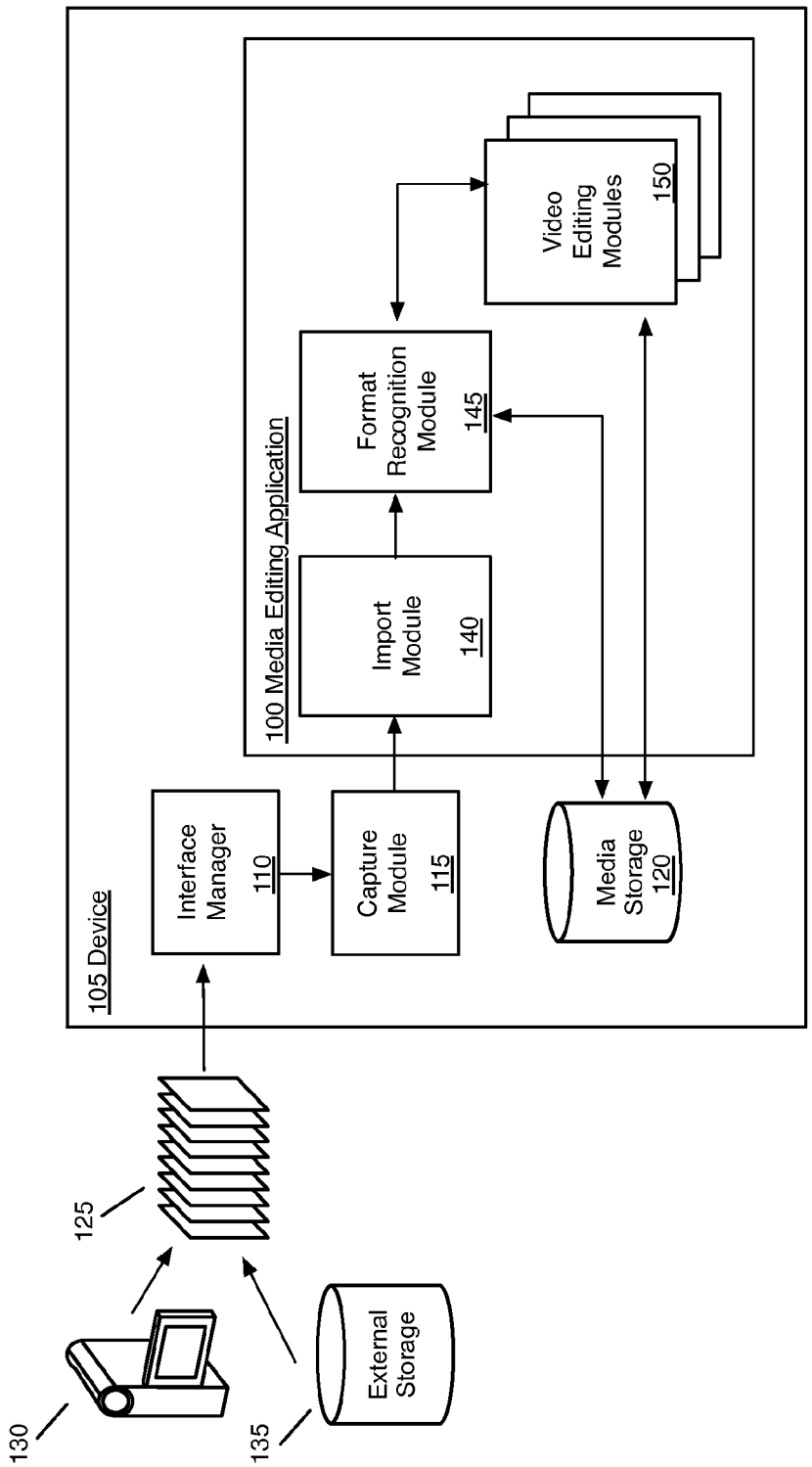
FIG. 1 conceptually illustrates the software architecture of a media-editing application of some embodiments.

FIG. 1 conceptually illustrates the software architecture of a media-editing application 100 of some embodiments. Some examples of such media-editing application include iMovie® and Final Cut Pro®, both sold by Apple Inc.® Specifically, the figure illustrates the architecture relating to a frame rate conversion detection process performed by the media-editing application 100. In some embodiments, the media-editing application is an application that enables a user to create a composite media presentation from a set of media files. Through a graphical user interface (GUI) of the application, the user specifies the manner in which the media files are composited to create the composite presentation. In addition, through this GUI, the user can command the application to import one or more media files (e.g., from a camera, from an external drive, from an internal drive, etc.) and detect the frame rate conversion method that was used to convert the imported media file.

As shown, the media-editing application 100 is run on a device 105. In some embodiments, the device 105 may be a computer dedicated to media-editing or may be a computer that includes numerous other programs (e.g., word processor, web-browser, gaming applications etc.). In addition to the media-editing application 100, the device also includes an interface manager 110, a capture module 115, as well as a media storage 120. In some embodiments, the media storage 140 is a set of file folders organized by the media-editing application 100 and stored on a particular set of storage devices. The storage devices may include the boot drive of the electronic device on which the application operates, a different partition of that disk, a separate internal or external hard drive, a flash drive, SD card, etc.

In some embodiments, the interface manager 110 receives a video file from a video source. In this example, the interface manager 110 receives a video file 125 from either a video capturing device 130 (e.g., a digital camcorder) or an external storage 135. The external storage 110 may be a an SD card, a flash drive, an external hard drive, an internal hard drive in which the files are not stored in an organized file folder structure of the media-editing application, etc.

The interface manager 110 relays the received video file to the capture module 115, which in some embodiments funnels the video from the low-level port manager (the interface manager 110) to the media-editing application 100. In some embodiments, this capture module 115 is part of the Quick-Time® Engine of Apple Inc.® In some embodiments, the capture module 115 is a part of the media-editing application 100.

The media-editing application 100 includes an import module 140, a format recognition module 145, and a set of video editing modules 150. In some embodiments, the import module 140 imports video files from the device 105 through the capture module 115 and sends the video files to the format recognition module 145.

Figure 2:
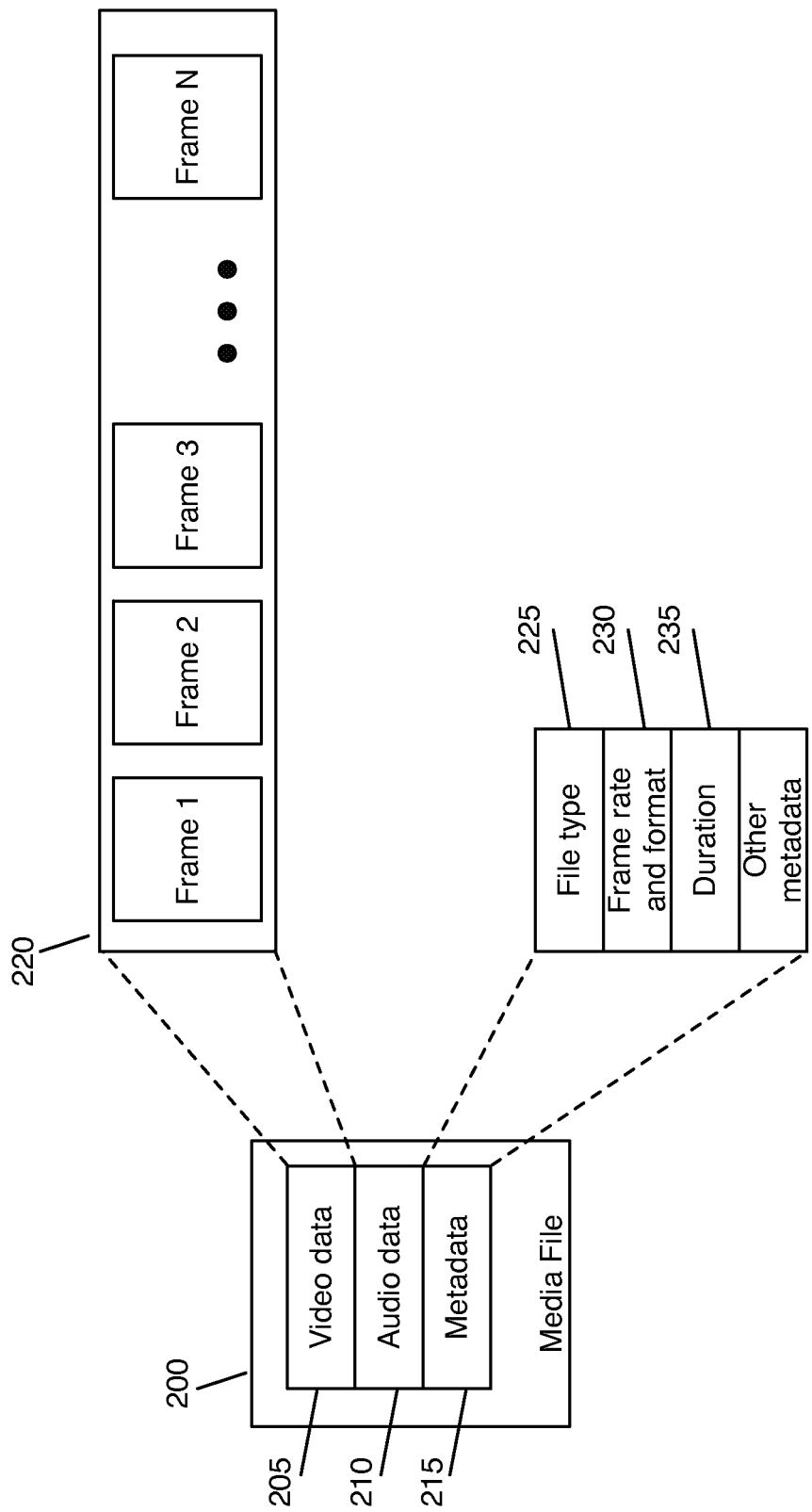
FIG. 2 conceptually illustrates the structure of a media file of some embodiments.

FIG. 2 illustrates a data structure 200 of a video file that can be imported to the media editing application 100. In some embodiments, the data structure is created at the time the video file is created (e.g., when the video is captured by a video capturing device). As shown in FIG. 2, the data structure 200 of the media file includes video data 205, audio data 210, and metadata 215.

The video data 205 includes a set of video frames 220 that are images captured at different instances in time by a video capturing device. The metadata 215 includes information about the video file, such as file type 225, frame rate and format 230, duration 235, and other metadata of the video file 200. The file type 225 indicates the type of the video 205 (e.g., MPEG4, AVI, WMV, etc.). The frame rate and format 230 indicates the manner in which the video should be played by a video display device. For example, a video file may be configured to be played at 24 frames per second, 50 fields per second, etc. The metadata 215 may also include other metadata that is related to the video 200.

As mentioned, different videos may have different frame rates and formats, and may be converted from one frame rate and format to another frame rate and format by using a frame rate conversion method. The video 125 in this example was captured by a video capturing device (e.g., the video capturing device 130) at 24 frames per second. However, the video 125 has been converted to a different frame rate (e.g., 30 frames per second) before it is imported into the media editing application 100. In some embodiments, upon receiving the video 125, the format recognition module 145 extracts the frame rate and format information from the video file 125. In some embodiments, the format recognition module 145 extracts the frame rate and format information by reading the metadata of the video 125. The format recognition module 145 also detects the native frame rate and format (i.e., the frame rate and format at which the video was created or captured) and the particular frame rate conversion method that has been used to convert the video 125 from the native frame rate and format to the current frame rate and format. In some embodiments, the format recognition module 145 performs the extraction and detection operations upon initiation by the video edition modules 150.

The video editing modules 150 edits the video as directed by a user to create a composite presentation. In some embodiments, the video editing modules uses the frame rate conversion method information detected by the format recognition module 145 to edit the video 125 (e.g., the editing modules may use the frame rate conversion method information to convert the video back to the video's native frame rate). After the video has been edited, the editing modules 150 saves the edited video 125 and the composite presentation in the media storage 120.

I. Video's Frame Rate and Format

As mentioned, the frame rate and format of a video indicates the manner in which the video should be played. Specifically, the format of a video indicates whether the video is interlaced or progressive, and the frame rate of the video indicates the speed at which the video should be played.

A video is progressive when the video is configured to be played one frame at a time. Thus, when a display device (e.g., a high-definition television) plays a progressive video, it plays the first frame, then the second frame, and then the third frame, and so forth. In addition, the frame rate and format of a progressive video is usually represented by the number of frames that are played within a period of time (e.g., 24 frames per second, also known as 24p).

Figure 6:
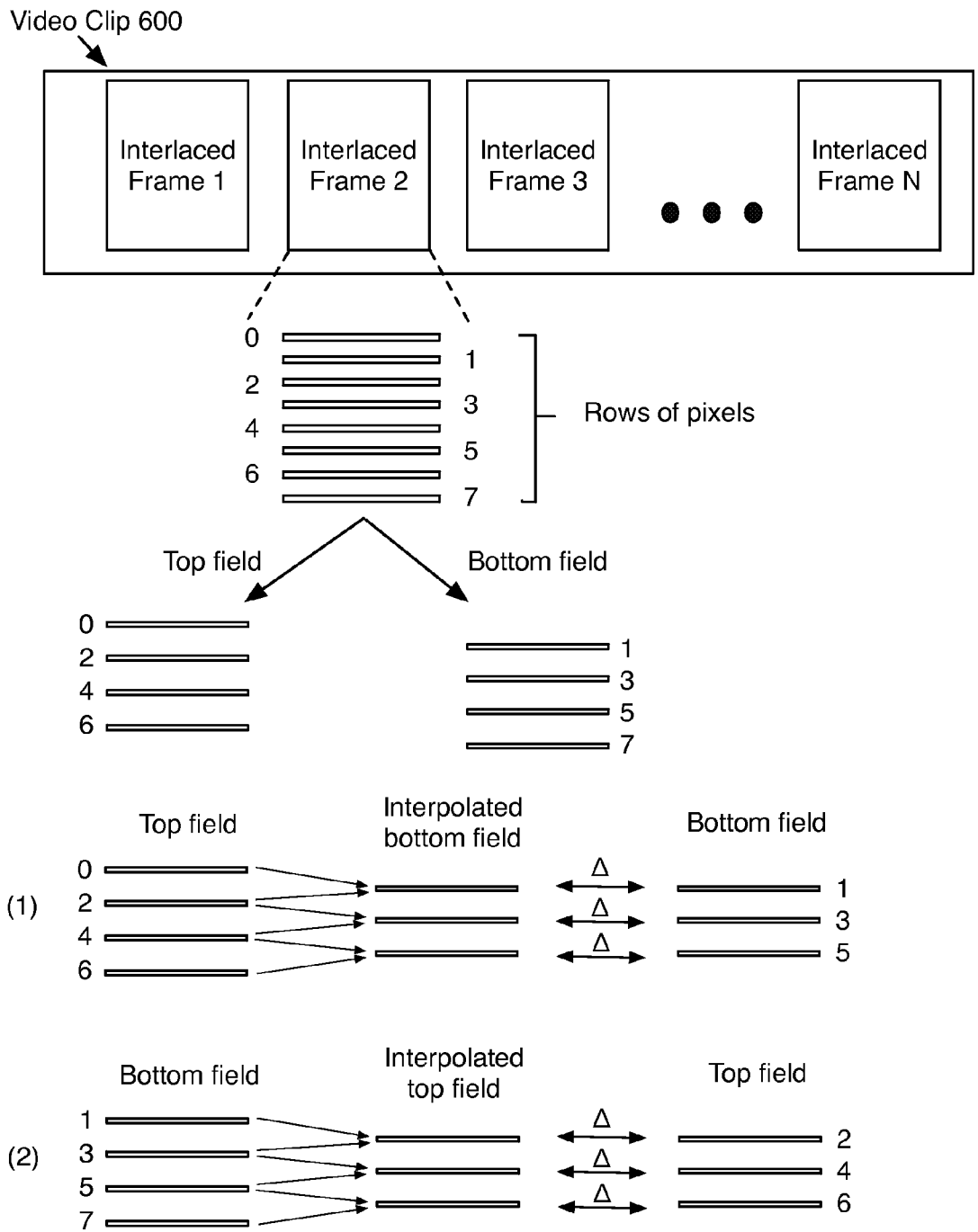
FIG. 6 illustrates an example of computing a correlation score between two fields.

A video is interlaced when each frame in the video is divided into two distinct and separable fields: a top field (also known as an even field) and a bottom field (also known as an odd field). The top field of an interlaced frame contains every other row of pixels in the frame, starting at the first row. The bottom field contains the remaining rows of pixels in the frame (i.e., every other row in the frame starting at the second row). Thus, for a video frame that contains 10 rows of pixels (i.e., row 0 to row 9), the top field of the video would contain rows 0, 2, 4, 6, and 8, and the bottom field of the video would contain rows 1, 3, 5, 7, and 9. FIG. 6 conceptually illustrates an interlaced video 600 that contains a set of frames (i.e., Frame 1, Frame 2, Frame 3 . . . Frame N). Each frame in the video 600 contains several rows of pixels. In the figure, Frame 2 is shown to contain 8 rows of pixels (i.e., rows 0 to 7). As shown, the top field of Frame 2 contains rows 0, 2, 4, and 6 while the bottom field of Frame 2 contains rows 1, 3, 5, and 7.

Unlike the progressive video, an interlaced video is configured to be played one field at a time as opposed to one frame at a time. Thus, when a display device (e.g., an NTSC television) plays an interlaced video, the display device alternates between top and bottom fields. If a video is in a top-field first format, the display device first displays the top field (i.e., the first field) of the first frame, then the bottom field (i.e., the second field) of the first frame, and then the top field of the second frame, and so forth. On the other hand, if a video is in a bottom-field first format, the display device first displays the bottom field (i.e., the first field) of the first frame, then the top field (i.e., the second field) of the first frame, and then the bottom field of the second frame, and so forth. In much of the discussion below, only the "first field" and the "second field" are used to refer to the two fields of a video frame. In this discussion, the first field refers to the top field of a frame and the second field refers to the bottom field of a frame for a top-field first video. Conversely, for a bottom-field first video, the first field refers to the bottom field of a frame and the second field refers to the top field of a frame. The frame rate and format of an interlaced video is usually represented by the number of fields that are played within a period of time (e.g., 60 fields per second, also known as 60i).

Videos have different frame rates and formats for several reasons. First, different video capturing devices (e.g., video cameras) capture videos at different frame rates. For example, professional grade video cameras usually capture videos at 24 frames per second while non-professional grade video cameras (e.g., camcorders) capture videos at 30 frames per second. Second, different video display devices support playing videos at different frame rates and formats. For example, PAL televisions play interlaced videos at 50 fields per second (50i). On the other hand, NTSC televisions support playing interlaced videos at 60 fields per second (60i). Accordingly, videos are often converted from one frame rate and format to another frame rate and format for storage or display in different devices. As such, many videos are stored at a frame rate and format that is different from the frame rate and format at which the video was captured (also known as the native frame rate and format). For example, a video that was captured by a professional-grade video camera must be converted from the video's native frame rate and format of 24 frames per second (24p) to 60 fields per second (60i) in order to be played at a NTSC television.

II. Frame Rate Conversion Detection

Figure 3:
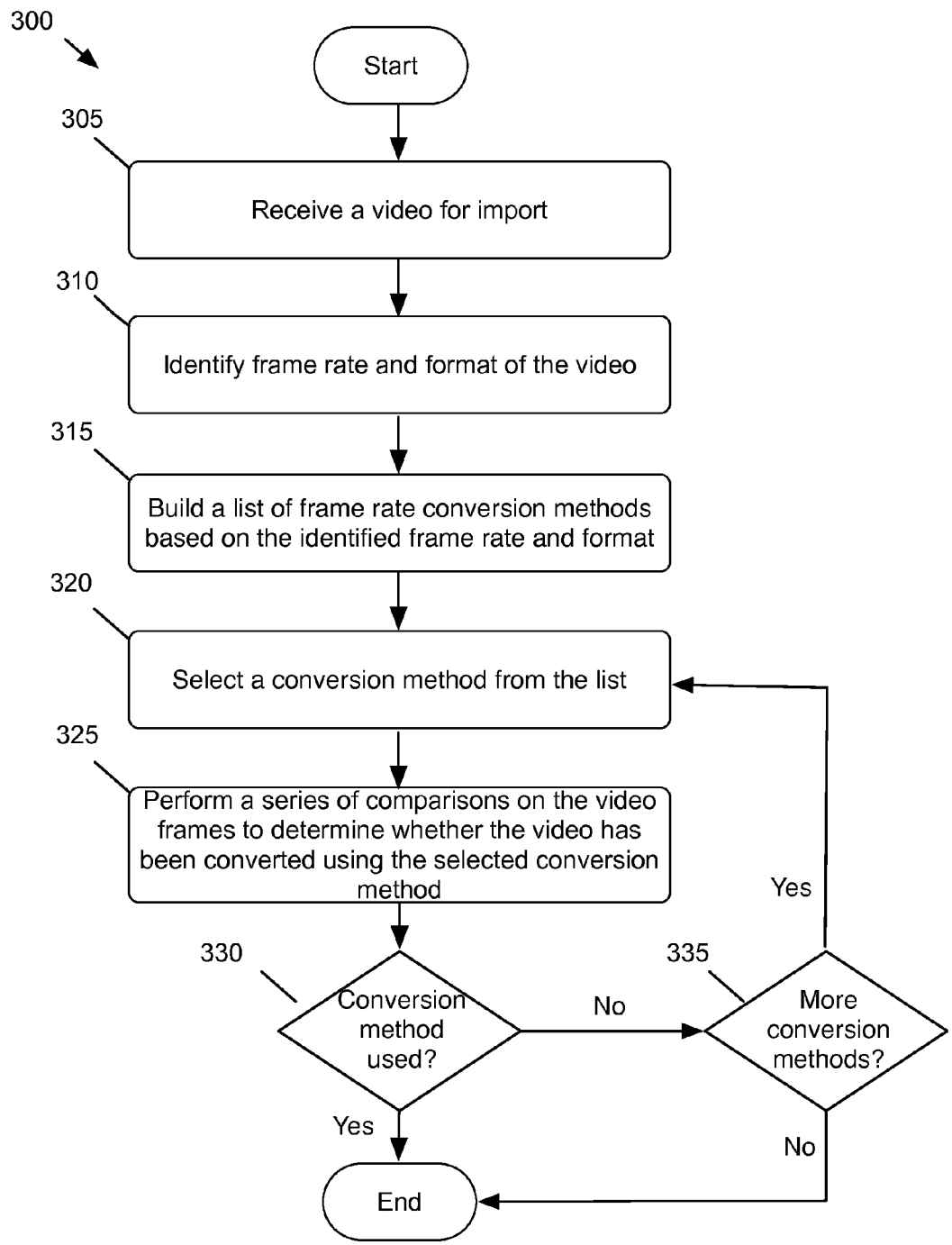
FIG. 3 illustrates a frame rate conversion detection process of some embodiments.

FIG. 3 conceptually illustrates a process 300 of some embodiments for detecting a frame rate conversion method that was used to convert a video to the video's current frame rate and format. In some embodiments, the process 300 is performed by the media-editing application during import of a media file. As shown, the process begins by receiving (at 305) a video for import. Next, the process identifies (at 310) the frame rate and format of the video.

As illustrated in FIG. 2, the frame rate and format information of a video may be stored as a metadata in the video file. Therefore, in some embodiments, the media-editing application identifies the frame rate and format of the video by extracting the frame rate and format information from the metadata of the video file.

As mentioned, a video may be converted from the video's native frame rate and format to a different frame rate and format for many reasons (e.g., so that the video can be played in different video display devices such as PAL televisions, high-definition televisions, NTSC televisions, etc.). Different frame rate conversion methods may be used to perform different frame rate and format conversions. In addition, a video may be converted from one particular frame rate to another particular frame rate using different frame rate conversion methods. For example, a video may be converted from a progressive format having 24 frames per second (24p) to an interlaced format having 60 fields per second (60i) using either a 3:2 pull-down, a 2:3:3:2 advanced pull-down, or a 2:2:2:4 pull-down method; a video may be converted from 24p to a progressive format having 60 frames per second using a 3:2 duplicate method; a video may be converted from 24p to an interlaced format having 50 fields per second (50i) using a 24@25 pull-down method; a video may also be converted from 24p to a progressive format having 25 frames per second (25p) using a 24@25 repeat method.

Next, the process builds (at 315) a list of frame rate conversion methods that can be used to convert the video based on the identified frame rate and format. For example, if the process identifies the frame rate and format of the video to be 60i, the list of frame rate conversion methods will include the 3:2 pull-down, the 2:3:3:2 advanced pull-down, and the 2:2:2:4 pull-down methods. The process then selects (at 320) a conversion method from the built list. The process next performs (at 325) a series of comparisons on the video frames to determine whether the video has been converted to the identified frame rate and format using the selected conversion method. Three types of computations are used when performing the series of comparisons. They are (1) frame difference, (2) self-correlation, and (3) cross-correlation. These three types of computations will be described in detail below by reference to FIGS. 4, 5, 6, 7, and 8. In addition, different series of comparisons will be performed based on the selected conversion method. The specific comparisons that will be performed for each conversion method will be described in detail below in Sections II.C-II.H.

Next, the process determines (at 330) whether the selected conversion method was used to convert the video based on the result from the series of comparisons. If it is determined that the selected conversion method was used, the process ends. If it is determined that the selected conversion method was not used, the process determines (at 335) whether there are more conversion methods to be selected from the built list. If there is no more conversion method to be selected from the list, the process ends. If there are more conversion methods to be selected from the list, the process returns to 320 to select another conversion method, and will cycle through 320-330 until all of the frame rate conversion methods from the list are selected.

A. Frame Difference

A Frame Difference (fd) value for two consecutive frames in a video indicates how much the two frames are different from each other. Thus, fd(i) indicates an amount of difference between Frame (i) and Frame (i+1). The Frame Difference value for two frames can be quantified in many different ways. In the embodiments described below, a larger fd value indicates a larger difference between the two frames and a smaller fd value indicates a smaller differences between the two frames. However, one of ordinary skill in the art will recognize that the formulation to compute the fd value may be modified so that a smaller fd value indicates a larger difference between the two frames and a larger fd value indicates a smaller differences between the two frames. For example, this can be done by inverting the logic of the mathematical expression (e.g. converting from $$f = a \times b \text{ to } f = \frac{\text{constant}}{a \times b}).$$

Figure 4:
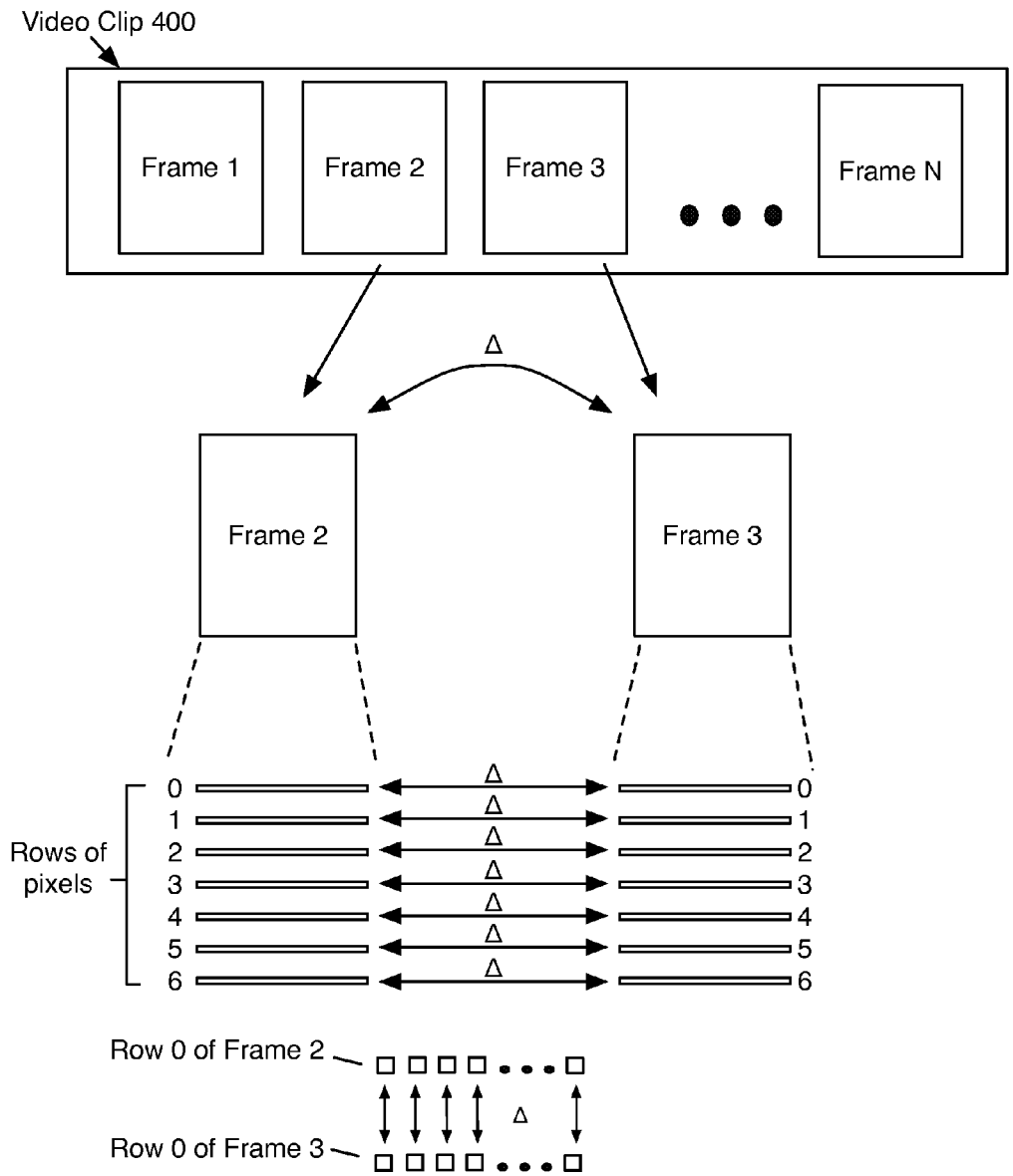
FIG. 4 illustrates an example of computing a frame difference value between two frames.
Figure 5:
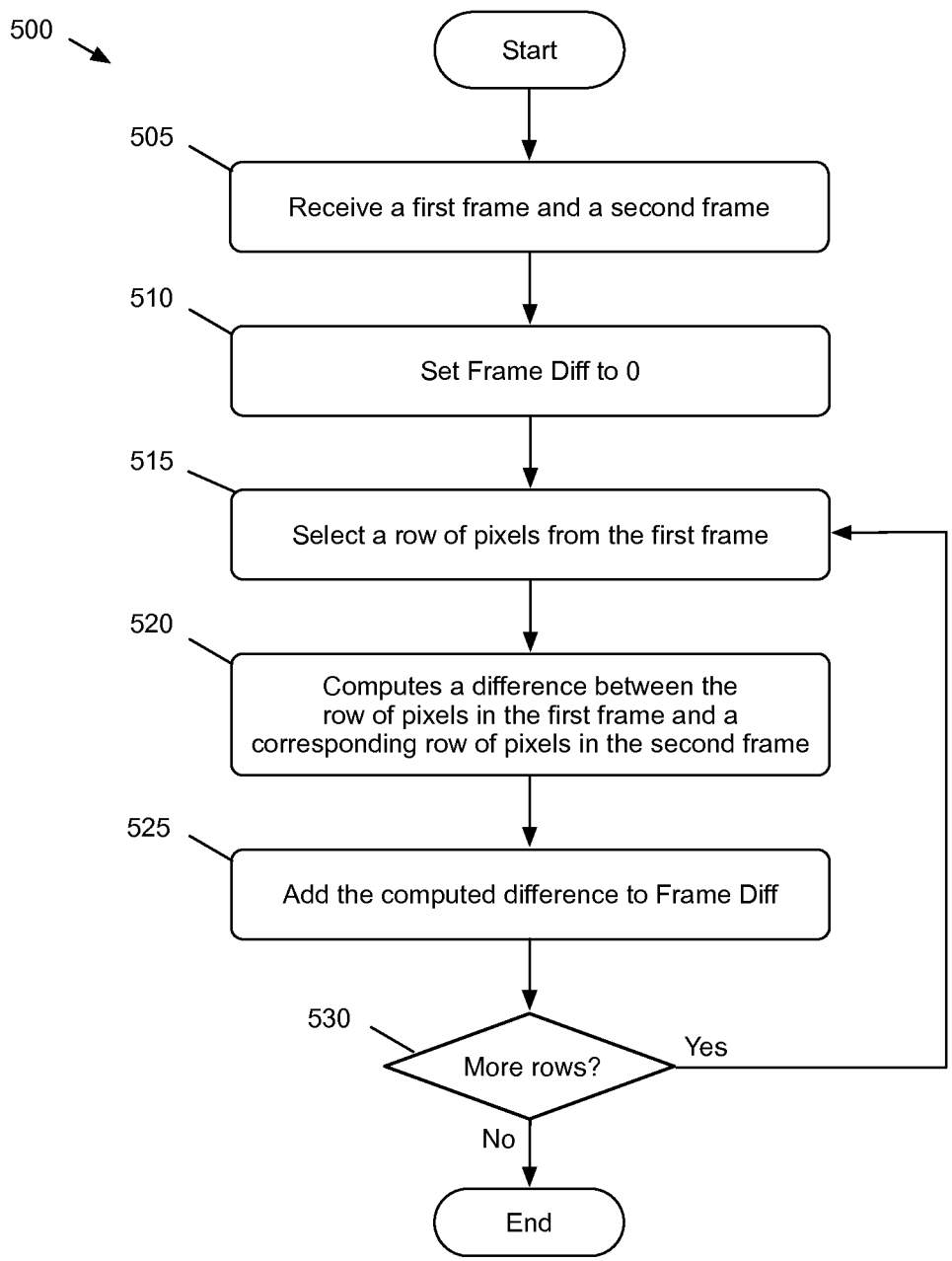
FIG. 5 illustrates a process of some embodiments for computing a frame difference value between two frames.

FIGS. 4 and 5 illustrates one approach to quantify a frame difference value for two frames. FIG. 5 conceptually illustrates a process 500 for computing an fd value for two frames by reference to FIG. 4. FIG. 4 conceptually illustrates an example of computing a frame difference of two frames in a video clip.

As shown in FIG. 5, the process begins by receiving (at 505) a first frame and a second frame. In some embodiments, the first and second frames are two consecutive frames of a video. Next, the process sets (at 510) a variable, Frame Diff, to 0. The process then selects (at 515) a row of pixels from the first frame. Next, the process computes (at 520) a difference between the row of pixels in the first frame and a corresponding row of pixels in the second frame.

Referring to FIG. 4, video 400 contains a set of video frames (Frame 1, Frame 2, Frame 3 . . . Frame N). Frame 2 and Frame 3 are selected from the video 400 for computing an fd value. As shown, each of the two frames is composed of seven rows of pixels (i.e., rows 0 to 6). In addition, to compute the fd value for Frames 2 and 3, each row of pixels in frame 2 is compared with a corresponding row of pixels in Frame 3. In some embodiments, a difference between a row of pixels in the first frame and a corresponding row of pixels in the second frame is the sum of absolute differences between each pixel in the row of the first frame and the corresponding pixel in the second frame.

A pixel in a video frame may be represented in different color models (e.g., Y'CbCr, RGB, etc.). Each color model uses a different set of color components to represent colors of the pixels. For example, the Y'CbCr color model represents colors using one luma component (Y) and two chroma components (Cb and Cr). As such, a pixel represented in the Y'CbCr color model will include a luma component value, and two chroma component values. Unlike the Y'CbCr color model, the RGB color model represents colors using a red component, a green component, and a blue component. Thus, a pixel represented in the RGB color model will include a red component value, a green component value, and a blue component value. In this example, the pixels of the video 400 are represented in a color model that includes a luma component (e.g., the Y'CbCr color model). In some embodiments, a difference between two pixels is computed by comparing the luma component values of the two pixels. However, one who is skilled in the art will recognize that the pixel in the video can be represented in any other color models, and a difference between two pixels can also be computed by comparing other color component values, in place of or in addition to, the luma component values of the two pixels.

Returning to FIG. 5, the process next adds (at 525) the computed difference to Frame Diff. The process then determines (at 530) whether there are any more rows in the first frame that have not been selected. If the process determines all rows in the first frame have been selected, the process ends. If the process determines that there are more rows in the first frame that have not been selected, the process returns to 515 to select another row from the first frame, and will cycle through 520-530 until all rows from the first frame are selected. The value for Frame Diff is the fd value for the first and second frames at the completion of the process.

B. Self-Correlation and Cross-Correlation

Unlike the frame difference value, a Self-Correlation (sc) or Cross-Correlation (cc) value indicates how well the two fields fit together in a video frame (i.e., how well the two fields correlate with each other in a frame). Specifically, self-correlation computes a correlation score for the first and second fields of the same frame, and cross-correlation computes a correlation score for the second field of a frame and the first field of the next frame. Thus, sc(i) represents a correlation for the top and bottom fields of Frame (i). For a top-field first video, cc(i) represents a correlation for the bottom field of Frame (i) and the top field of Frame (i+1), while for a bottom-field first video, cc(i) represents a correlation for the top field of Frame (i) and the bottom field of Frame (i+1). In the embodiments described below, a smaller sc or cc value indicates that the two fields fit better together in a frame (i.e., the two fields correlate with each other better in a frame) and a larger sc or cc value indicates that the two fields do not fit well in a frame (i.e., the two fields do not correlate with each other well in a frame). However, one of ordinary skill in the art will recognize that the formulation to compute the sc or cc value may be modified so that a larger sc or cc value would indicate that the two fields fit better together in a frame (i.e., the two fields correlate with each other better in a frame) and a smaller sc or cc value indicates that the two fields do not fit well in a frame (i.e., the two fields do not correlate with each other well in a frame). For example, this can be done by inverting the logic of the mathematical expression (e.g. converting from $$f = a \times b \text{ to } f = \frac{\text{constant}}{a \times b}).$$

Figure 7:
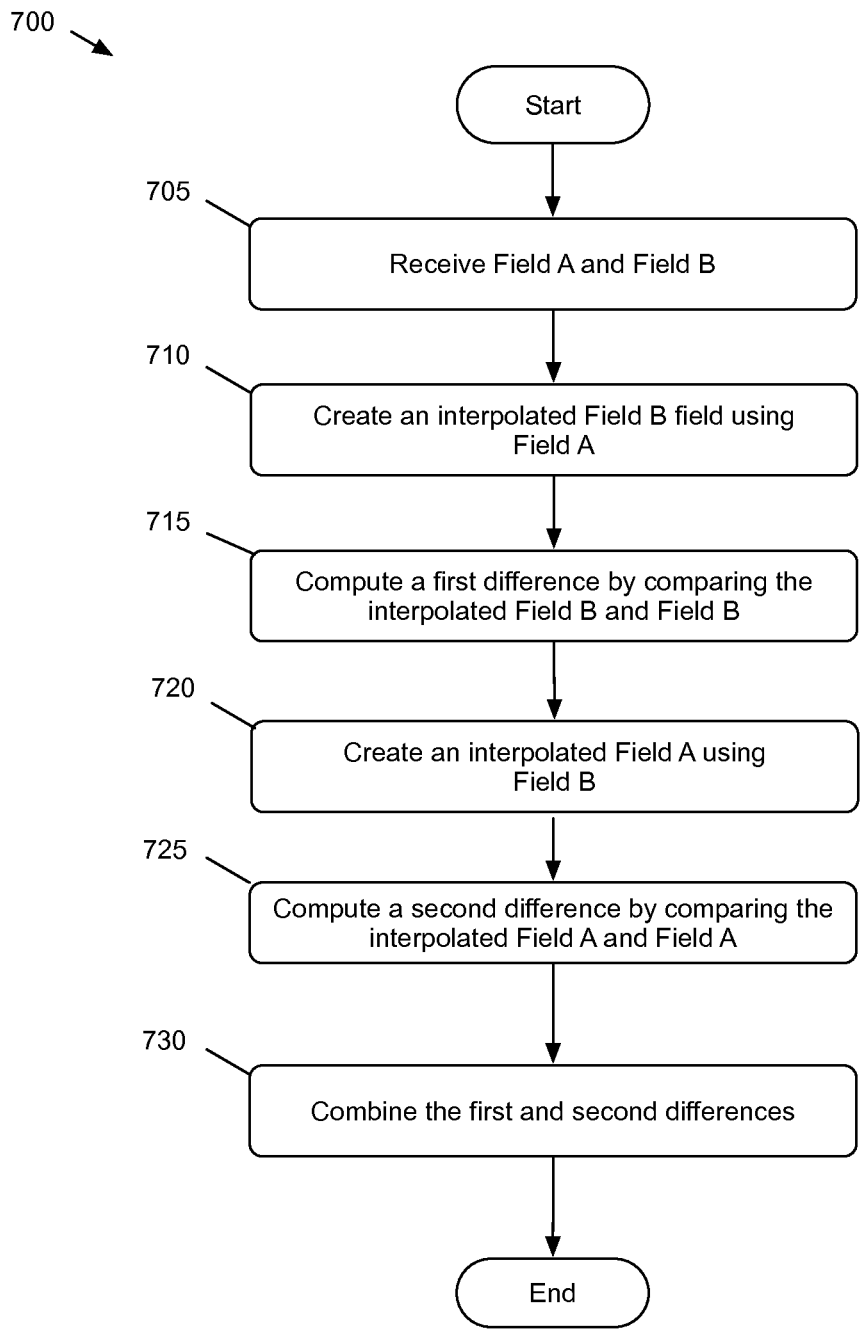
FIG. 7 illustrates a process of some embodiments for computing a correlation score between two fields.
Figure 8:
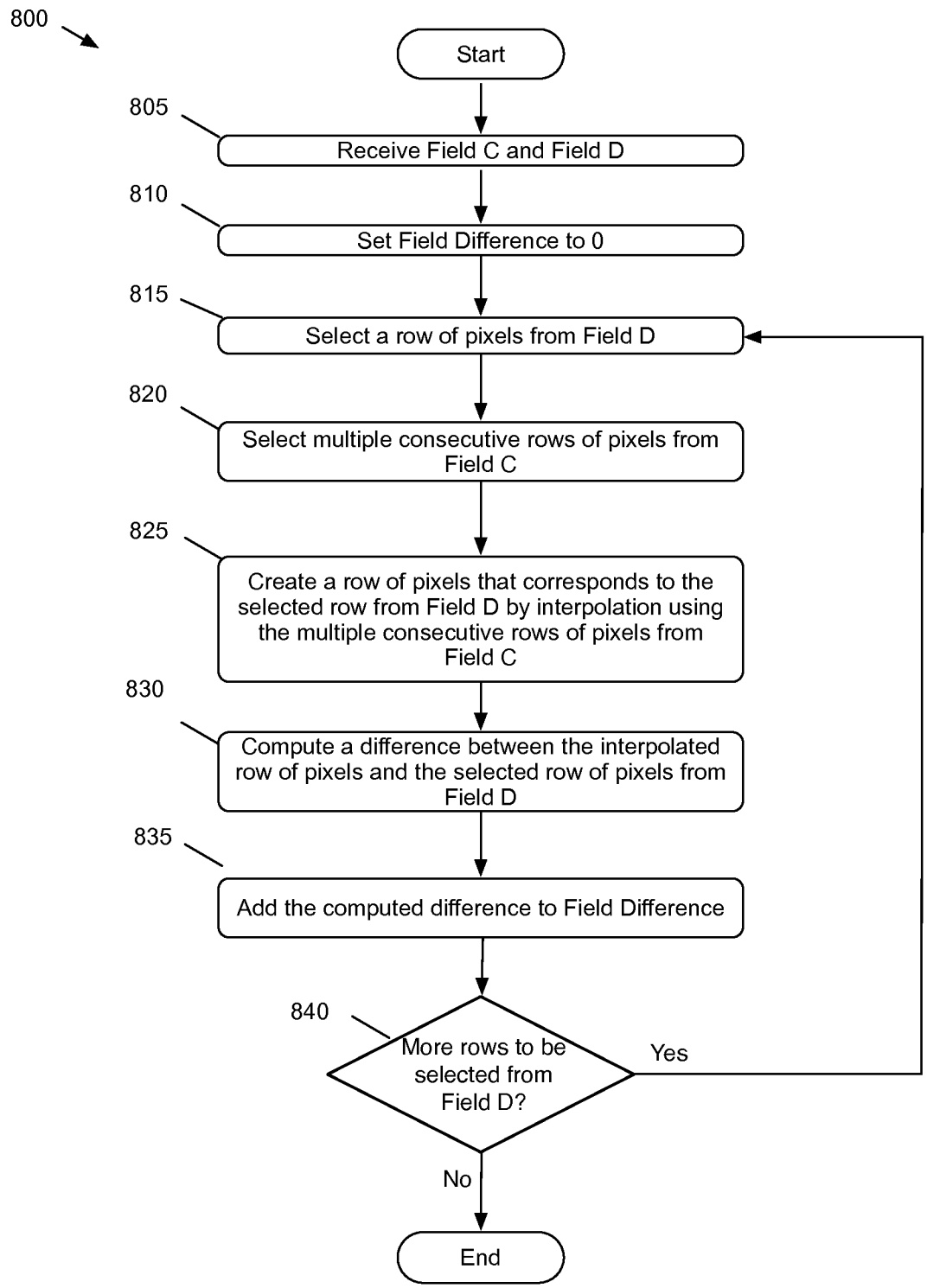
FIG. 8 illustrates a process of some embodiments for creating an interpolated field and computing a field difference value between the interpolated field and the corresponding field.

FIG. 7 conceptually illustrates a process 700 for computing a correlation score (i.e., an sc value or a cc value) for two fields by reference to FIGS. 6 and 8. FIG. 8 conceptually illustrates a process 800 for creating an interpolated field and computing a field difference between the interpolated field and an actual field. FIG. 6 conceptually illustrates an example of computing a correlation score for two fields in a video clip.

As shown in FIG. 7, the process begins by receiving (at 705) Field A and Field B. As mentioned, the same process 700 may be used to calculate an sc value or a cc value. To calculate an sc value, the top and bottom fields of the same frame in a video are received as Field A and Field B. To calculate a cc value for a top-field first video, the bottom field of a frame and the top field of the next frame are received as Field A and Field B, respectively. To calculate a cc value for a bottom-field first video, the top field of a frame and the bottom field of the next frame are received as Field A and Field B, respectively. Next, the process creates (at 710) an interpolated Field B using Field A. Different embodiments create the interpolated field differently. In some embodiments, each row of the interpolated Field B is created by interpolation using two consecutive rows from Field A that are closest to the row in Field B. Other embodiments may create each row in the interpolated Field B by interpolation using more than two rows from Field A. Also, in some embodiments, different weights may be assigned to different rows in Field A during the interpolation process. The process then computes (at 715) a first difference by comparing the interpolated Field B and Field B.

The creation of interpolated Field B and the computation of the first difference are further illustrated by reference to FIG. 8. As shown in FIG. 8, the process 800 begins by receiving (at 805) Field C and Field D. In this example, Field A and Field B from FIG. 7 are received as Field C and Field D, respectively. Next, the process sets (at 810) a variable, Field Difference, to zero. The process then selects (at 815) a row of pixels from Field D. The process next selects (at 820) multiple consecutive rows of pixels from Field C. As mentioned, some embodiments of the invention select only two consecutive rows of pixels from Field C that are located closest to the selected row of Field D. The process then creates (at 825) a row of pixels that correspond to the selected row of Field D by interpolation using the selected rows of pixels from Field C. In some embodiments, each pixel value of the interpolated row is the average of the corresponding pixel values from the two consecutive rows in Field C.

Next, the process computes (at 830) a difference between the interpolated row of pixels and the selected row of pixels from Field D. As mentioned, in some embodiments, a difference between two rows of pixels is the sum of the absolute differences between each pixel in one of the two rows and a corresponding pixel in the other row.

As mentioned, a pixel in a video frame may be represented in different color models (e.g., Y'CbCr, RGB, etc.). Each color model uses a different set of color components to represent colors of the pixels. In this example, the pixels in the two fields are represented in a color model that includes a luma component (e.g., the Y'CbCr color model). In some embodiments, a difference between two pixels is computed by comparing the luma component values of the two pixels. However, one who is skilled in the art will recognize that the pixel in the video can be represented in any other color models, and a difference between two pixels can also be computed by comparing other color component values, in place of or in addition to, the luma component values of the two pixels.

The process then adds (at 835) the computed difference to Field Difference. The process next determines if there are more rows to be selected from Field D. If there are no more rows to be selected from Field D, the process ends. If there are more rows that have not been selected from Field D, the process returns to 815 to select another row of pixels from Field D, and will cycle through 815-840 until all rows from the Field D are selected.

Returning to FIG. 7, the process next creates (at 720) an interpolated Field A using Field B. The process then computes (at 725) a second difference by comparing the interpolated Field A and Field A. The creation of the interpolated Field A and the computation of the second difference may be performed using the same process illustrated by FIG. 8 as described above, except that the Field B from FIG. 7 is received as Field C and Field A from FIG. 7 is received as Field D. The process then combines (at 730) the first and second differences to obtain the sc value or the cc value for the two fields, and ends.

FIG. 6 illustrates an example of computing self-correlation value for two fields. As shown, video 600 contains a set of interlaced frames (i.e., Frame 1, Frame 2, Frame 3 . . . Frame N). In the figure, Frame 2 is expanded to show the top and bottom fields. Specifically, the top field of Frame 2 includes rows 0, 2, 4, and 6, and the bottom field includes rows 1, 3, 5, and 7. During operation (1), an interpolated bottom field of Frame 2 is created by interpolation using the top field of Frame 2. In this example, each row in the interpolated bottom field is created by interpolation using the two closest rows in the top field (i.e., interpolated row 1 is created using rows 0 and 2 of Frame 2). Each row in the interpolated bottom field is then compared with the corresponding row in the bottom field. During operation (2), an interpolated top field is created by interpolation using the bottom field of Frame 2. In this example, each row in the interpolated top field is created by interpolation using the two closest rows in the bottom field (i.e., interpolated row 2 is created using rows 1 and 3 of Frame 2). Each row in the interpolated top field is then compared with the corresponding row in the top field.

Some embodiments of the invention enhances the speed of computing the frame difference values and correlation scores by using a special set of processing instructions such as the Streaming SIMD Extensions (SSE) instruction set developed by Intel®. The SSE instruction set reduces the speed of processing when the same operation (e.g., adding, subtracting, etc.) is performed on multiple data objects. Therefore, in some embodiments, the SSE instruction set is used to improve performance when computing differences between multiple pairs of pixels during the frame difference, self-correlation, and cross-correlation operations.

C. Detecting a Conversion from 24p to 60i Using a 3:2 Pull-Down Method

As mentioned, a video may be converted from one particular frame rate and format to another frame rate and format using one of several conversion methods. The 3:2 pull-down is one such method for converting a video from a progressive format having 24 frames per second (24p) to an interlaced format having 60 fields per second (60i).

Figure 9:
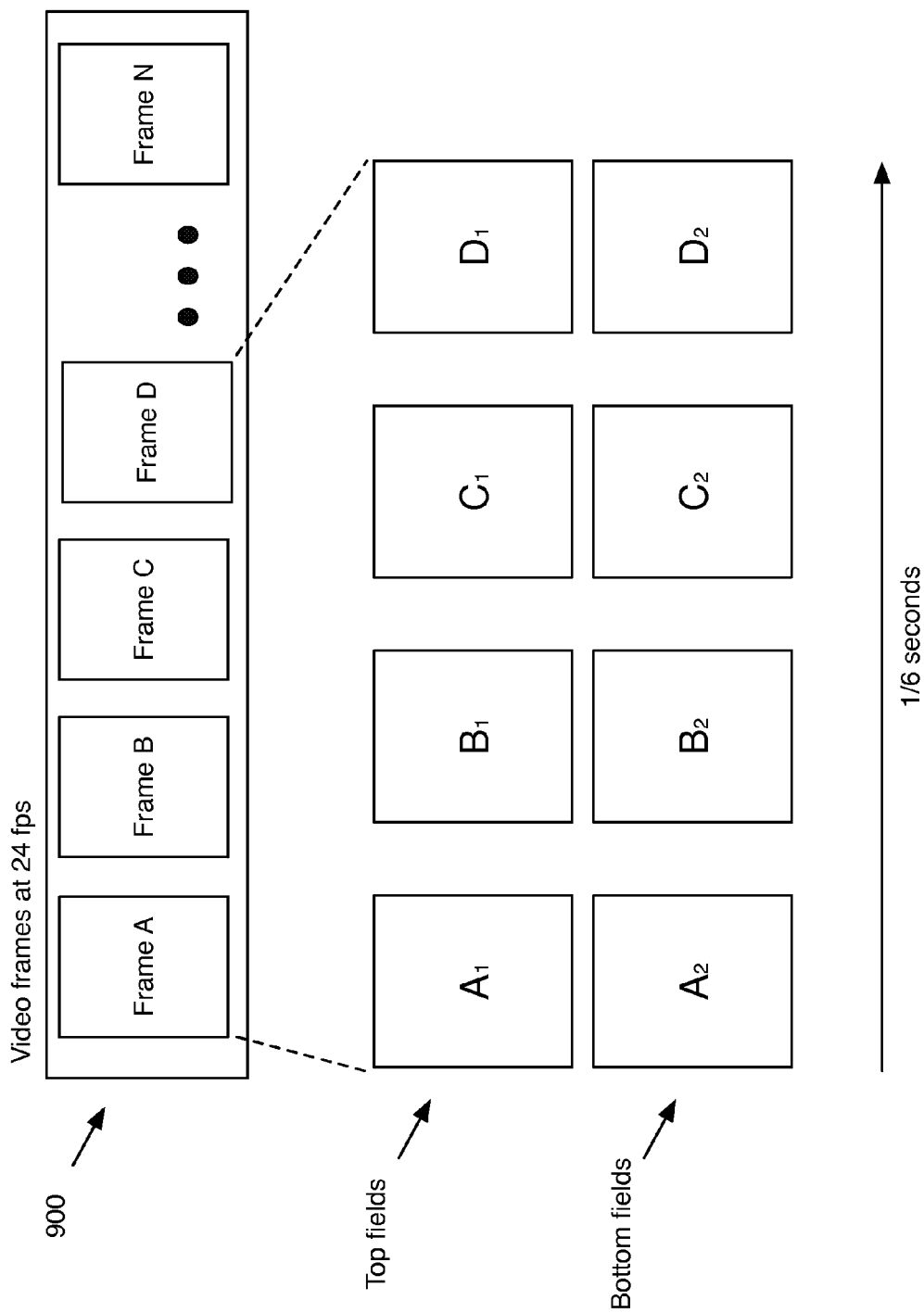
FIG. 9 illustrates an example of a 24p video.

FIG. 9 illustrates a progressive video 900 that has a frame rate of 24 frames per second. As shown, the video 900 has a set of frames that includes Frame A, Frame B, Frame C, Frame D . . . Frame N. In addition, the figure shows that the video 900 plays four frames within ⅙ of a second. In order to convert the video 900 from a progressive format to an interlaced format (e.g., 60i), each frame in the video 900 is divided into two fields. As shown in the figure, Frames A, B, C, and D are illustrated to include the top and bottom fields. Specifically, Frame A consists of a top field $A_1$ and a bottom field $A_2$, Frame B consists of a top field $B_1$ and a bottom field $B_2$, Frame C consists of a top field $C_1$ and a bottom field $C_2$, and finally, Frame D consists of a top field $D_1$ and a bottom field $D_2$.

Figure 10:
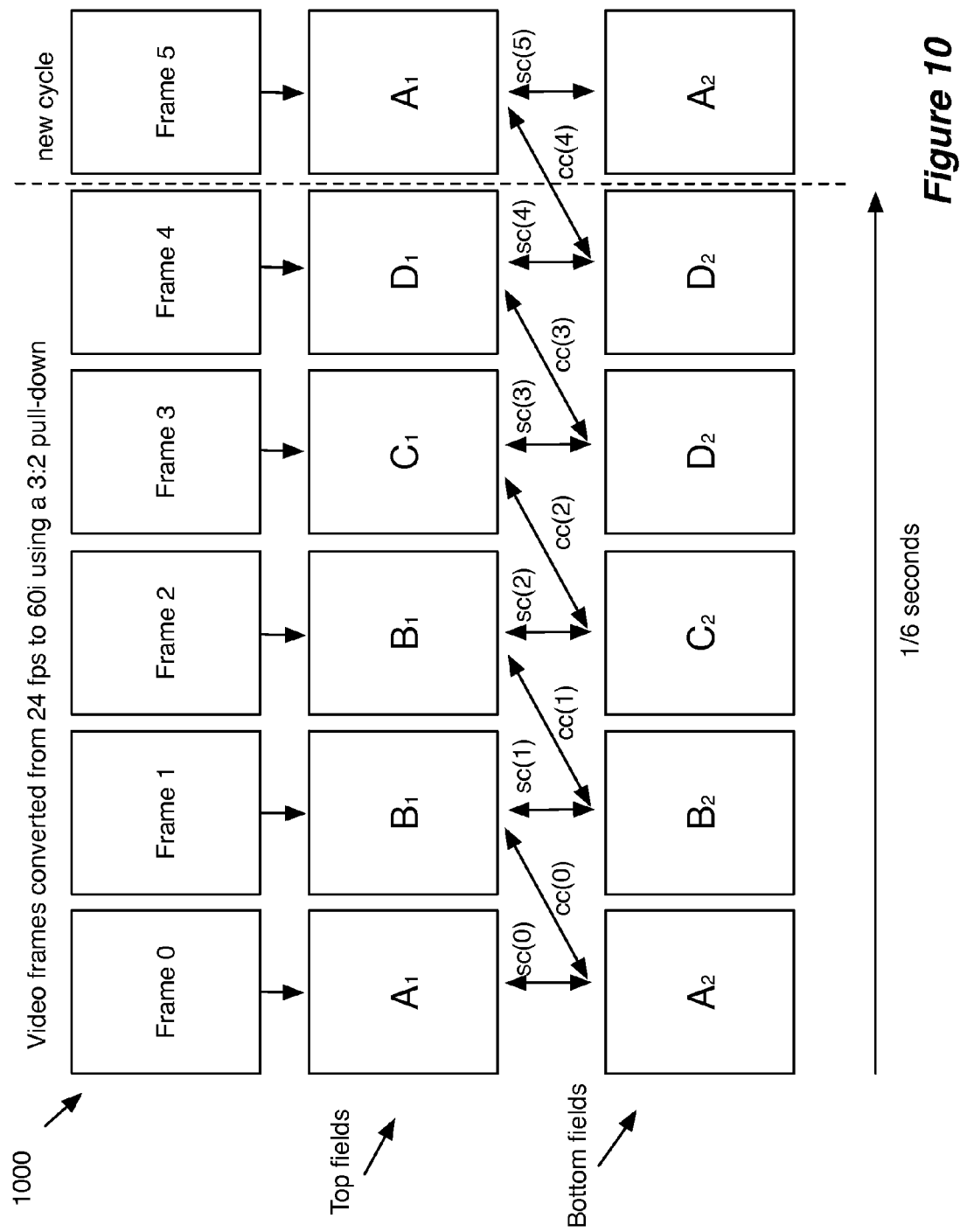
FIG. 10 illustrates an example of a video that has been converted from 24p to 60i using the 3:2 pull-down method.

FIG. 10 conceptually illustrates a set of frames 1000 of a video after the video 900 of FIG. 9 has been converted from 24p to 60i using the 3:2 pull-down method. As shown, the set of video frames includes Frame 0, Frame 1, Frame 2, Frame 3, Frame 4, and Frame 5. The frames are shown to include the top and bottom fields that correspond to the top and bottom fields of the video frames in FIG. 9. The figure also shows that the video 1000 plays five frames within ⅙ of a second. Thus, the video 1000 plays one more frame every ⅙ of a second than the video 900 of FIG. 9.

The 3:2 pull-down method converts the video from 24p to 60i by repeating a top field and a bottom field every ⅙ of a second. Specifically, as shown in the figure, the top field of Frame B, $B_1$, is repeated in Frame 2 and the bottom field of Frame D, $D_2$, is repeated in Frame 4. As a result, Frame 0 includes top field $A_1$ and bottom field $A_2$, Frame 1 includes top field $B_1$ and bottom field $B_2$, Frame 2 includes repeated top field $B_1$ and bottom field $C_2$, Frame 3 includes top field $C_1$ and bottom field $D_2$, and Frame 4 includes top field $D_1$ and repeated bottom field $D_2$. Finally, Frame 5 begins a new cycle that includes top and bottom fields from the same frame of the video 900 of FIG. 9. Every video that has been converted from 24p to 60i using the 3:2 pull-down method will have the field pattern as shown in FIG. 10. FIG. 10 shows the field pattern created by the 3:2 pull-down method for a top-field first video. For a bottom-field video, the field pattern will be identical except that the top and bottom fields are switched. Thus, the bottom field of Frame B, $B_2$, is repeated in Frame 2 and the top field of Frame D, $D_1$, is repeated in Frame 4.

In the description that follows, the first field of a frame refers to the top field and the second field of a frame refers to the bottom field when the video is in a top-field first format. Conversely, the first field of a frame refers to the bottom field and the second field of a frame refers to the top field when the video is in a bottom-field first format.

Different embodiments provide different ways to detect whether a video has been converted using the 3:2 pull-down method. One approach to detect whether a video has been converted using the 3:2 pull-down method is by determining whether such a field pattern exists in the video. In some embodiments, the existence of the field pattern can be determined by computing self-correlation and cross correlation values for different fields within a group of consecutive frames and comparing those values. In some embodiments, the group of video frames is in the display order of the video. For example, the following set of conditions can determine whether the field pattern created by a 3:2 pull down method exists within a group of six consecutive frames. (1) the self-correlation value for the first and second fields of Frame 0 is smaller than the cross-correlation value for the second field of Frame 0 and the first field of Frame 1 (i.e., sc(0)<cc(0)). (2) The self-correlation value for the first and second fields of Frame 1 is smaller than the cross-correlation value for the second field of Frame 0 and the first field of Frame 1 (i.e., sc(1)<cc(0)). (3) The cross-correlation value for the second field of Frame 1 and the first field of Frame 2 is smaller than the self-correlation value for the first and second fields of Frame 2 (i.e., cc(1)<sc(2)). Some embodiments also add a multiplier to sc(2) to compensate changes to the pixel values caused by encoding and decoding of the video. Encoding is often performed on videos to reduce the size of the video files for storage and transmission. During encoding of a video, some areas of a video image may lose details (e.g., from the characteristics of lossy compression). As such, two neighboring pixels having very different pixel values in the original video may have identical or similar pixel values after the video is compressed and decompressed. Consequently, two very different fields may appear to be more alike (having lower sc or cc values) than what they were before encoding. For example, Frame 2 of FIG. 10 consists of top field $B_1$ and bottom field $C_2$ that come from two different frames in the original video. As such, the self-correlation value for Frame 2 (i.e., sc(2)) should be large. However, the use of encoding/decoding on the video may cause the top and bottom fields of Frame 2 to be more alike and resulting in a smaller self-correlation value. Therefore, some embodiments also require that, under condition (3), cc(1) is smaller than sc(2) by a predetermined threshold (e.g., cc(1)<sc(2)+threshold). Instead of (or in addition to) using a threshold, some embodiments adjusts the value (i.e., increases the value) of sc(2) by a factor before comparing the two values (e.g., cc(1)<sc(2)×factor). In some embodiments, the value of the threshold and the factor are determined through empirical data.

(4) The cross-correlation value for the second field of Frame 2 and the first field of Frame 3 is smaller than the self-correlation value for the first and second fields of Frame 2 (i.e., cc(2)<sc(2)). To compensate changes to the pixel values caused by encoding of the video, some embodiments also require that, under condition (4), cc(2) is smaller than sc(2) by a predetermined threshold (e.g., cc(2)<sc(2)+threshold). Instead of (or in addition to) using a threshold, some embodiments adjusts the value (i.e., increases the value) of sc(2) by a factor before comparing the two values (e.g., cc(2) <sc(2)×factor). In some embodiments, the value of the threshold and the factor are determined through empirical data. (5) The cross-correlation value of the second field of Frame 2 and the first field of Frame 3 is smaller than the self-correlation value for the first and second fields of Frame 3 (i.e., cc(2)<sc (3)). To compensate changes to the pixel values caused by encoding of the video, some embodiments also require that, under condition (5), cc(2) is smaller than sc(3) by a predetermined threshold (e.g., cc(2)<sc(3)+threshold). Instead of (or in addition to) using a threshold, some embodiments adjusts the value (i.e., increases the value) of sc(3) by a factor before comparing the two values (e.g., cc(2)<sc(3)×factor). In some embodiments, the value of the threshold and the factor are determined through empirical data. (6) The cross-correlation value for the second field of Frame 3 and the first field of Frame 4 is smaller than the self-correlation value for the first and second fields of Frame 3 (i.e., cc (3)<sc(3)). To compensate changes to the pixel values caused by encoding of the video, some embodiments also require that, under condition (6), cc(3) is smaller than sc(3) by a predetermined threshold (e.g., cc(3)<sc(3)+threshold). Instead of (or in addition to) using a threshold, some embodiments adjusts the value (i.e., increases the value) of sc(3) by a factor before comparing the two values (e.g., cc(3)<sc(3)×factor). In some embodiments, the value of the threshold and the factor are determined through empirical data. (7) The self-correlation value for the first and second fields of Frame 4 is smaller than the cross-correlation value of the second field of Frame 4 and the first field of Frame 5 (i.e., sc (4)<cc(4)). Finally, (8) the self-correlation value for the first and second fields of Frame 5 is smaller than the cross-correlation value for the second field of Frame 4 and the first field of Frame 5 (i.e., sc (5)<cc(4)).

In some embodiments, the factors that are used in conditions (3)-(6) are the same factor. In other embodiments, the factors are given different values based on empirical data.

The comparisons used in the above illustration only show one way of detecting the existence of the field pattern created by the 3:2 pull-down method, other embodiments may perform different comparisons to make the same detection. Furthermore, to account for changes to pixel values introduced during encoding of the video and/or other processing, some embodiments of the invention conclude that the pattern exists even if a number of the conditions are not met. For example, some embodiments declare that the pattern exists if all but one or two conditions are met. The number of the conditions that are allowed to fail may be determined by empirical data.

Figure 11:
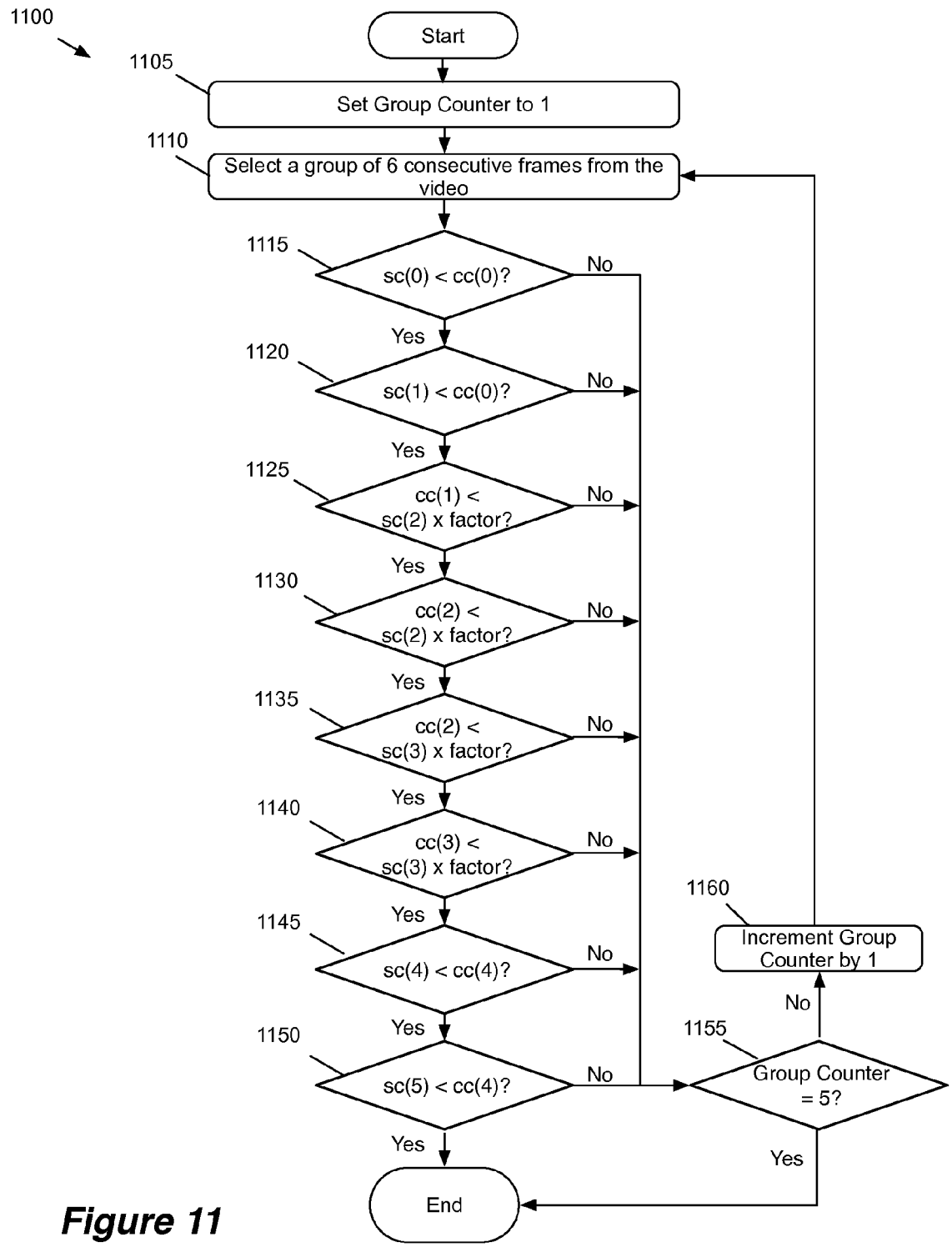
FIG. 11 illustrates a process of some embodiments for detecting whether the video has been converted from 24p to 60i using the 3:2 pull-down method.

FIG. 11 conceptually illustrates a process 1100 for using the approach described above to detect whether a video has been converted from 24p to 60i using the 3:2 pull-down method. Some embodiments perform this process at the step 325 in FIG. 3 after the video is identified to have a frame rate and format of 60i. As shown, the process 1100 begins by setting (at 1105) a variable, Group Counter, to 1. Next, the process selects (at 1110) a group of 6 consecutive frames from the video. In some embodiments, the group of video frames is in the display order of the video. The process then determines (at 1115) whether sc(0) is smaller than cc(0). If the process determines that sc(0) is not smaller than cc(0), the process goes to 1155 and determines (at 1155) whether Group Counter has a value of 5. If the process determines that Group Counter has a value of 5, the process ends. If the process determines that Group Counter does not have a value of 5, the process increments (at 1160) the Group Counter by 1 and returns to 1110 to select another group of 6 consecutive frames from the video. Some embodiments select another group of 6 frames by shifting the last group of frames by one (i.e., moving from Frames 0-5 to Frames 1-6). The process will cycle through 1160-1150 until Group Counter has a value of 5. In some embodiments, the process performs several iterations of the comparisons to several different groups of frames because the pattern illustrated in FIG. 10 may begin at the first, second, third, fourth or fifth frame of the converted video.

If the process determines that sc(0) is smaller than cc(0), the process determines (at 1120) whether sc(1) is smaller than cc(0). If the process determines that sc(1) is not smaller than cc(0), the process goes back to 1155 and performs the same determination as described above.

If the process determines that sc(1) is smaller than cc(0), the process determines (at 1125) whether cc(1) is smaller than sc(2). As mentioned above, some embodiments apply a threshold or a factor in this comparison to compensate changes to the pixel values caused by encoding of the video. In some embodiments, this step includes adjusting the value of sc(2) before comparing sc(2) with cc(1). Some embodiments of the invention increases the value of sc(2) by multiplying, adding, or dividing the value of sc(2) by a predetermined factor. If the process determines that cc(1) is not smaller than sc(2), the process goes back to 1155 and performs the same determination as described above.

If the process determines that cc(1) is smaller than sc(2), the process determines (at 1130) whether cc(2) is smaller than sc(2). As mentioned above, some embodiments apply a threshold or a factor in this comparison to compensate changes to the pixel values caused by encoding of the video. In some embodiments, this step includes adjusting the value of sc(2) before comparing sc(2) with cc(2). Some embodiments of the invention increases the value of sc(2) by multiplying, adding, or dividing the value of sc(2) by a predetermined factor. If the process determines that cc(2) is not smaller than sc(2), the process goes back to 1155 and performs the same determination as described above.

If the process determines that cc(2) is smaller than sc(2) by a factor, the process determines (at 1135) whether cc(2) is smaller than sc(3). As mentioned, some embodiments apply a threshold or a factor in this comparison to compensate changes to the pixel values caused by encoding of the video. In some embodiments, this step includes adjusting the value of sc(3) before comparing sc(3) with cc(2). Some embodiments of the invention increases the value of sc(3) by multiplying, adding, or dividing the value of sc(3) by a predetermined factor. If the process determines that cc(2) is not smaller than sc(3), the process goes back to 1155 and performs the same determination as described above.

If the process determines that cc(2) is smaller than sc(3), the process determines (at 1140) whether cc(3) is smaller than sc(3) by a factor. As mentioned above, some embodiments apply a threshold or a factor in this comparison to compensate changes to the pixel values caused by encoding of the video. In some embodiments, this step includes adjusting the value of sc(3) before comparing sc(3) with cc(3). Some embodiments of the invention increases the value of sc(3) by multiplying, adding, or dividing the value of sc(3) by a predetermined factor. If the process determines that cc(3) is not smaller than sc(3), the process goes back to 1155 and performs the same determination as described above.

If the process determines that cc(3) is smaller than sc(3), the process determines (at 1145) whether sc(4) is smaller than cc(4). If the process determines that sc(4) is not smaller than cc(4), the process goes back to 1155 and performs the same determination as described above.

If the process determines that sc(4) is smaller than cc(4), the process determines (at 1150) whether sc(5) is smaller than cc(4). If the process determines that sc(5) is not smaller than cc(4), the process goes back to 1155 and performs the same determination as described above. On the other hand, if the process determines that sc(5) is smaller than cc(4), some embodiments conclude that the video has been converted from 24p to 60i using the 3:2 pull-down method, and the process ends.

Figure 12:
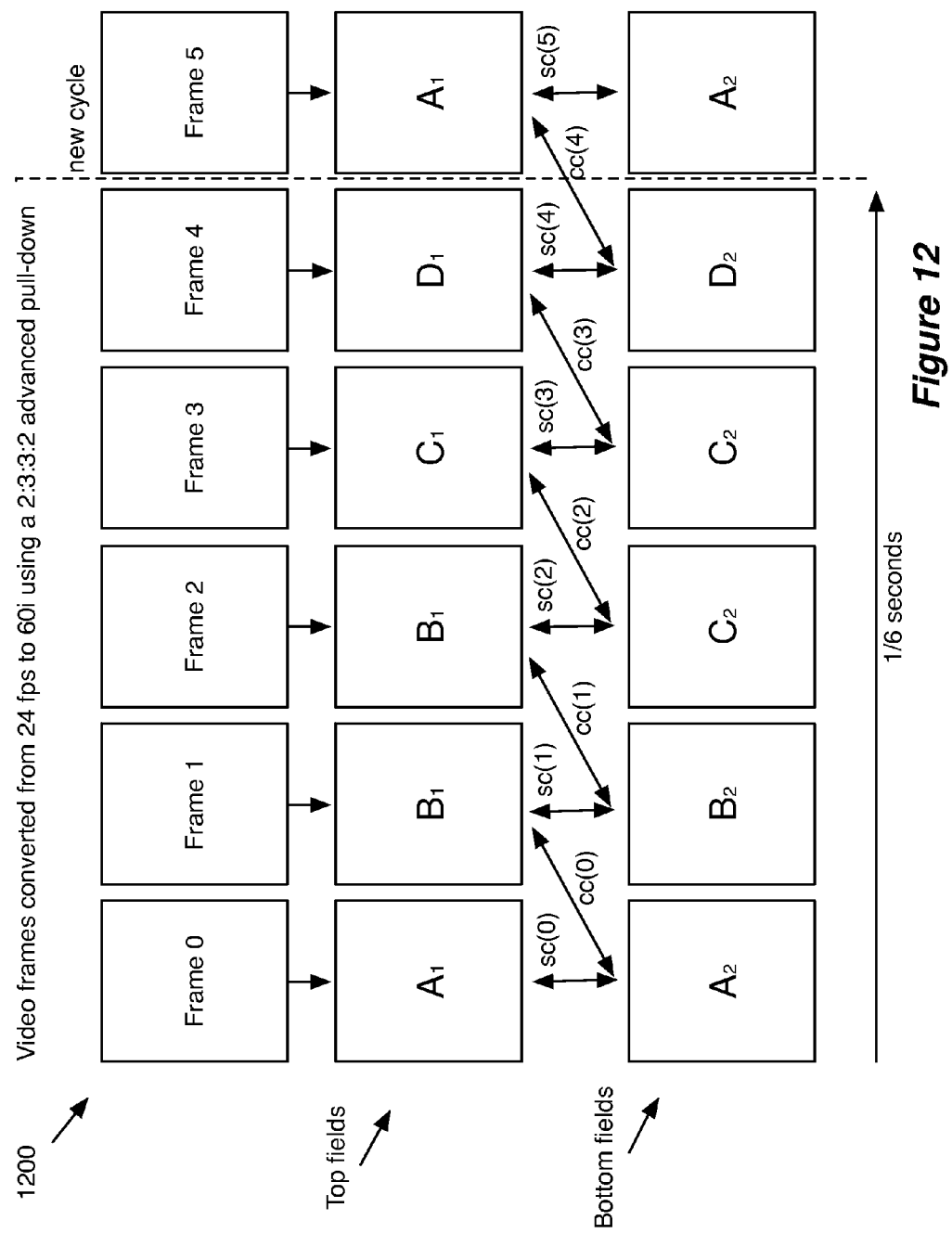
FIG. 12 illustrates an example of a video that has been converted from 24p to 60i using the 2:3:3:2 advanced pull-down method.

D. Detecting a Conversion from 24p to 60i Using a 2:3:3:2 Advanced Pull-Down Method FIG. 10 illustrates a video that has been converted from 24p to 60i using a 3:2 pull-down method. FIG. 12 conceptually illustrates a video that has been converted from 24p to 60i using another method, a 2:3:3:2 advanced pull-down method.

As shown in FIG. 12, the set of video frames 1200 includes the first six frames of a video after the video 900 of FIG. 9 has been converted from 24p to 60i using the 2:3:3:2 advanced pull-down method. As shown, the set of video frames 1200 includes Frame 0, Frame 1, Frame 2, Frame 3, Frame 4, and Frame 5. The frames are shown to include the top and bottom fields that correspond to the top and bottom fields of the video frames in FIG. 9. The figure also shows that the video 1200 plays five frames within ⅙ of a second. Thus, the video 1200 plays one more frame every ⅙ of a second than the video 900 of FIG. 9.

Similar to the 3:2 pull-down method, the 2:3:3:2 pull-down method converts the video from 24p to 60i by repeating a first field and a second field every ⅙ of a second. However, unlike the 3:2 pull-down method, the 2:3:3:2 pull-down method repeats the top field of Frame B, $B_1$, in Frame 2 and repeats the bottom field of Frame C, $C_2$, in Frame 3. As a result, Frame 0 of the video 1200 includes top field $A_1$ and bottom field $A_2$, Frame 1 includes top field $B_1$ and bottom field $B_2$, Frame 2 includes repeated top field $B_1$ and bottom field $C_2$, Frame 3 includes top field $C_1$ and repeated bottom field $C_2$, and Frame 4 includes top field of $D_1$ and bottom field of $D_2$. Finally, Frame 5 begins a new cycle that includes top and bottom fields from the same frame. Every video that has been converted from 24p to 60i using the 2:3:3:2 pull-down method will have the field pattern as illustrated in FIG. 12. FIG. 12 shows the field pattern created by the 2:3:3:2 pull-down method for a top-field first video. For a bottom-field video, the field pattern will be identical except that the top and bottom fields are switched. Thus, the bottom field of Frame B, $B_2$, is repeated in Frame 2 and the top field of Frame C, $C_1$, is repeated in Frame 3.

In the description that follows, the first field of a frame refers to the top field and the second field of a frame refers to the bottom field when the video is in a top-field first format. Conversely, the first field of a frame refers to the bottom field and the second field of a frame refers to the top field when the video is in a bottom-field first format.

Different embodiments provide different ways to detect whether a video has been converted using the 2:3:3:2 pull-down method. One approach to detect whether a video has been converted from 24p to 60i using the 2:3:3:2 pull-down method is by determining whether such a field pattern exists in the video. In some embodiments, the existence of such field pattern can be determined by computing self-correlation and cross correlation computation values for different fields within a group of frames and comparing those values. In some embodiments, the group of video frames is in the display order of the video. For example, the following set of conditions can determine whether the field pattern created by a 2:3:3:2 pull down method exists within a group of 6 consecutive frames. (1) The self-correlation value for the first and second fields of Frame 0 is smaller than the cross-correlation value for the second field of Frame 0 and the first field of Frame 1 (i.e., sc(0)<cc(0)). (2) The self-correlation value for the first and second fields of Frame 1 is smaller than the cross-correlation value for the second field of Frame 0 and the first field of Frame 1 (i.e., sc(1)<cc(0)). (3) The cross-correlation value for the second field of Frame 1 and the first field of Frame 2 is smaller than the self-correlation value for the first and second fields of Frame 2 (i.e., cc(1)<sc(2)). To compensate changes to the pixel values caused by encoding of the video, some embodiments also require that cc(1) is smaller than sc(2) by a predetermined threshold (e.g., cc(1)<sc(2)+threshold). Instead of (or in addition to) using a threshold, some embodiments adjusts the value (i.e., increases the value) of sc(2) by a factor before comparing the two values (e.g., cc(1)<sc(2)×factor). In some embodiments, the value of the threshold and the factor are determined through empirical data. (4) The cross-correlation value for the second field of Frame 2 and the first field of Frame 3 is smaller than the self-correlation value for the first and second fields of Frame 2 (i.e., cc(2)<sc(2)). To compensate changes to the pixel values caused by encoding of the video, some embodiments also require that cc(2) is smaller than sc(2) by a predetermined threshold (e.g., cc(2)<sc(2)+threshold). Instead of (or in addition to) using a threshold, some embodiments adjusts the value (i.e., increases the value) of sc(2) by a factor before comparing the two values (e.g., cc(2)<sc(2)×factor). In some embodiments, the value of the threshold and the factor are determined through empirical data. (5) The self-correlation value for the first and second fields of Frame 3 is smaller than the cross-correlation value for the second field of Frame 3 and the first field of Frame 4 (i.e., sc(3)<cc(3)). (6) The self-correlation value for the first and second fields of Frame 4 is smaller than the cross-correlation value for the second field of Frame 3 and the first field of Frame 4 (i.e., sc(4)<cc(3)). (7)

The self-correlation value for the first and second fields of Frame 4 is smaller than the cross-correlation value for the second field of Frame 4 and the first field of Frame 5 (i.e., sc(4)<cc(4)). Finally, (8) the self-correlation value for the first and second fields of Frame 5 is smaller than the cross-correlation value for the second field of Frame 4 and the first field of Frame 5 (i.e., sc(5)<cc(4)).

In some embodiments, the factors that are used in conditions (3)-(4) are the same factor. In other embodiments, the factors are given different values based on the empirical data.

The above comparisons only illustrate one way of detecting the existence of the field pattern, other embodiments may perform different series of comparisons to make the same detection. Furthermore, to account for changes to pixel values introduced during encoding of the video and/or other processing, some embodiments of the invention may conclude that the pattern exists even if a number of the conditions are not met. For example, some embodiments may declare that the pattern exists if all but one or two conditions are met. The number of the conditions that are allowed to fail may be determined by empirical data.

Figure 13:
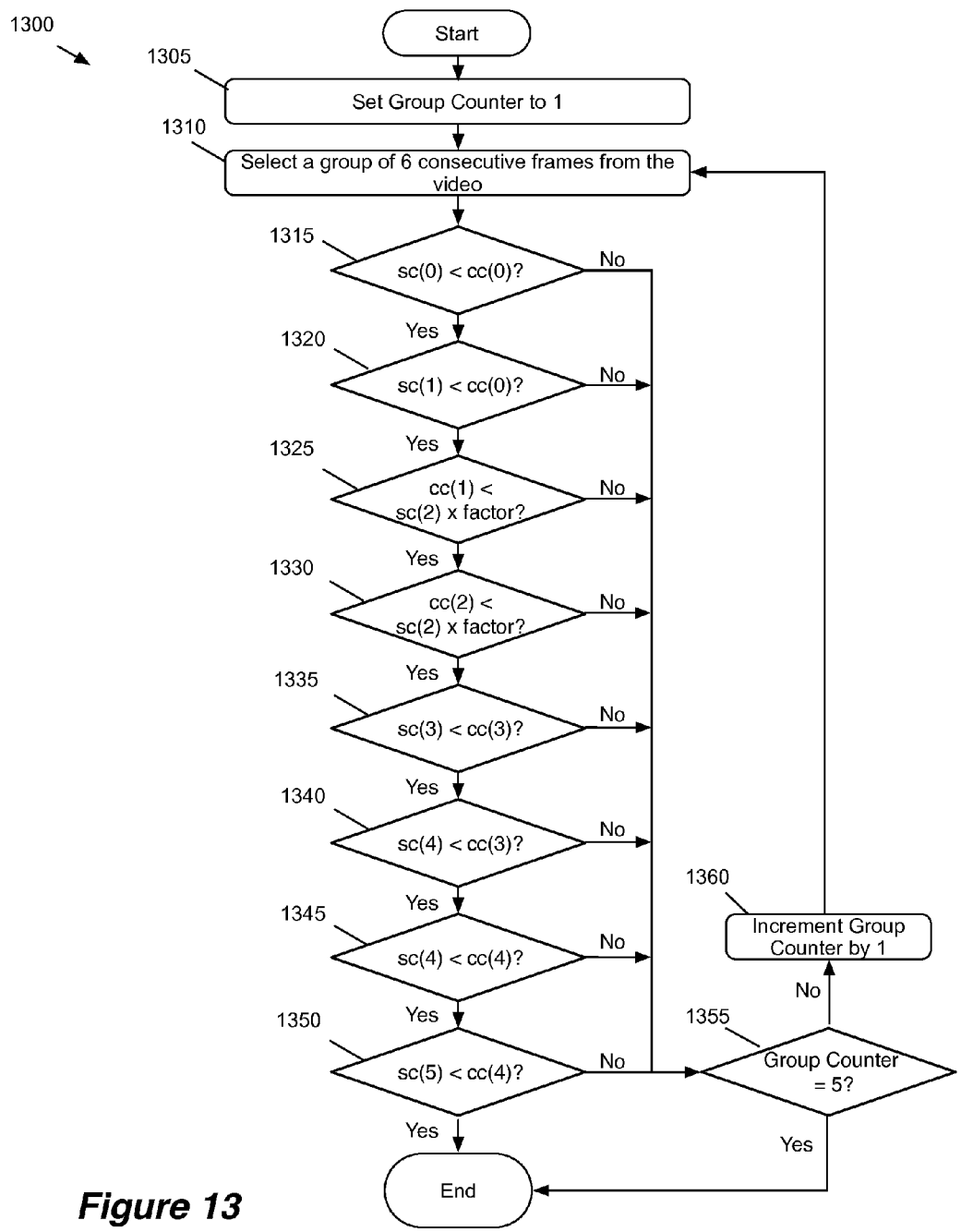
FIG. 13 illustrates a process of some embodiments for detecting whether the video has been converted from 24p to 60i using the 2:3:3:2 advanced pull-down method.

FIG. 13 conceptually illustrates a process 1300 for using the approach described above to detect whether a video has been converted from 24p to 60i using the 2:3:3:2 advanced pull-down method. Some embodiments perform this process after the video is identified to have a frame rate and format of 60i. As shown, the process 1300 begins by setting (at 1305) a variable, Group Counter, to 1. Next, the process selects (at 1310) a group of 6 consecutive frames from the video. In some embodiments, the group of video frames is in the display order of the video. The process then determines (at 1315) whether sc(0) is smaller than cc(0). If the process determines that sc(0) is not smaller than cc(0), the process goes to 1355 and determines (at 1355) whether Group Counter has a value of 5. If the process determines that Group Counter has a value of 5, the process ends. If the process determines that Group Counter does not have a value of 5, the process increments (at 1360) the Group Counter by 1 and returns to 1310 to select another group of 6 consecutive frames from the video. Some embodiments select another group of 6 frames by shifting the last group of frames by one (i.e., moving from Frames 0-5 to Frames 1-6). The process will cycle through 1360-1350 until Group Counter has a value of 5. In some embodiments, the process performs several iterations of the comparisons to several groups of frames because the pattern illustrated in FIG. 12 may begin at the first, second, third, fourth or fifth frame of the converted video.

If the process determines that sc(0) is smaller than cc(0), the process determines (at 1320) whether sc(1) is smaller than cc(0). If the process determines that sc(1) is not smaller than cc(0), the process goes back to 1355 and performs the same determination as described above.

If the process determines that sc(1) is smaller than cc(0), the process determines (at 1325) whether cc(1) is smaller than sc(2). As mentioned above, some embodiments apply a threshold or a factor in this comparison to compensate changes to the pixel values caused by encoding of the video. In some embodiments, this step includes adjusting the value of sc(2) before comparing sc(2) with cc(1). Some embodiments of the invention increases the value of sc(2) by multiplying, adding, or dividing the value of sc(2) by a predetermined factor. If the process determines that cc(1) is not smaller than sc(2), the process goes back to 1355 and performs the same determination as described above.

If the process determines that cc(1) is smaller than sc(2), the process determines (at 1330) whether cc(2) is smaller than sc(2). As mentioned above, some embodiments apply a threshold or a factor in this comparison to compensate changes to the pixel values caused by encoding of the video. In some embodiments, this step includes adjusting the value of sc(2) before comparing sc(2) with cc(2). Some embodiments of the invention increases the value of sc(2) by multiplying, adding, or dividing the value of sc(2) by a predetermined factor. If the process determines that cc(2) is not smaller than sc(2), the process goes back to 1355 and performs the same determination as described above.

If the process determines that cc(2) is smaller than sc(2), the process determines (at 1335) whether sc(3) is smaller than cc(3). If the process determines that sc(3) is not smaller than cc(3), the process goes back to 1355 and performs the same determination as described above.

If the process determines that sc(3) is smaller than cc(3), the process determines (at 1340) whether sc(4) is smaller than cc(3). If the process determines that sc(3) is not smaller than cc(3), the process goes back to 1355 and performs the same determination as described above.

If the process determines that sc(4) is smaller than cc(3), the process determines (at 1345) whether sc(4) is smaller than cc(4). If the process determines that sc(4) is not smaller than cc(4), the process goes back to 1355 and performs the same determination as described above.

If the process determines that sc(4) is smaller than cc(4), the process determines (at 1350) whether sc(5) is smaller than cc(4). If the process determines that sc(4) is not smaller than cc(4), the process goes back to 1355 and performs the same determination as described above. On the other hand, if the process determines that sc(5) is smaller than cc(4), some embodiments conclude that the video has been converted from 24p to 60i using the 2:3:3:2 pull-down method, and the process ends.

E. Detecting a Conversion from 24p to 60i Using a 2:2:2:4 Pull-Down Method

Figure 14:
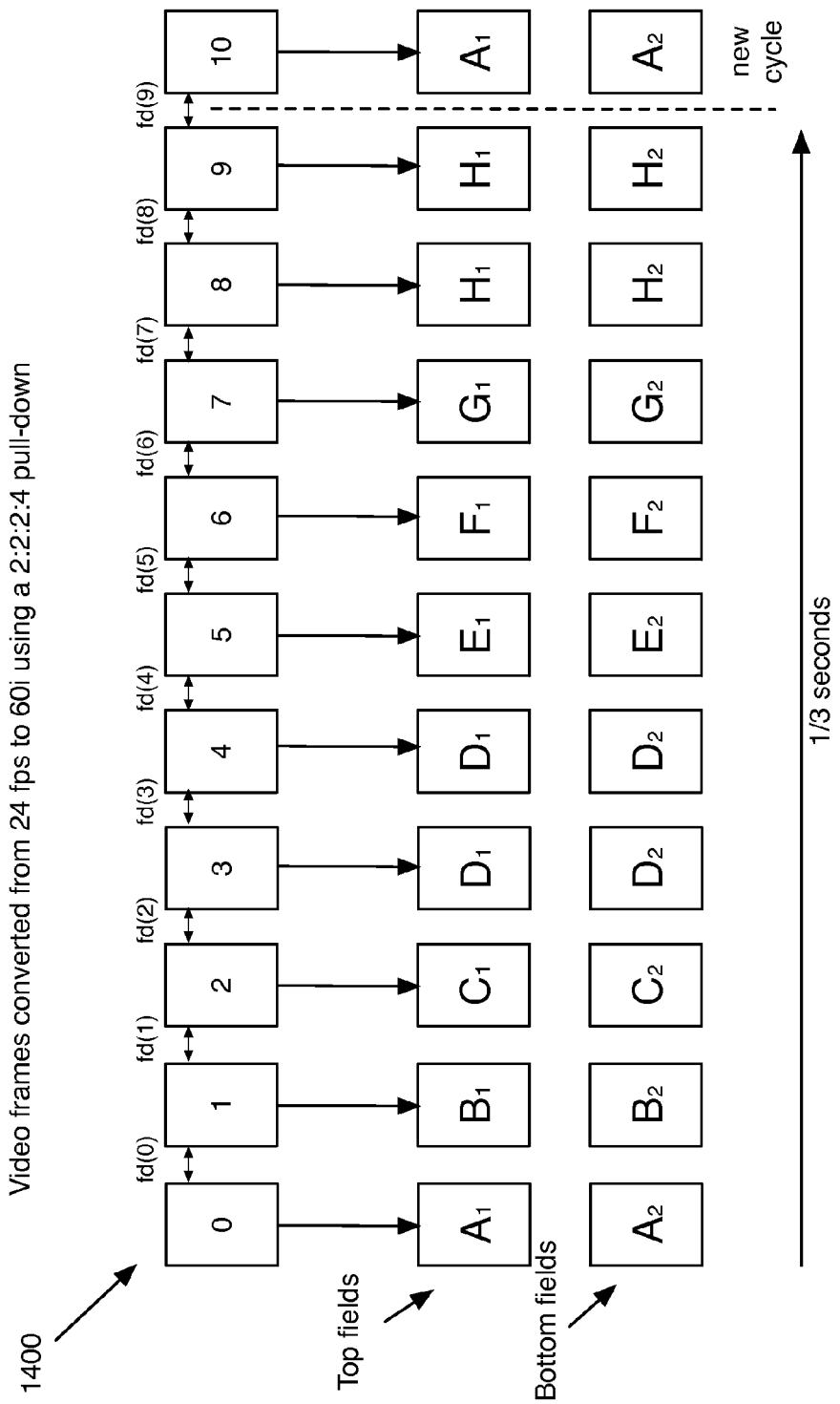
FIG. 14 illustrates an example of a video that has been converted from 24p to 60i using the 2:2:2:4 pull-down method.

FIGS. 10 and 12 illustrate two different methods in converting a video from 24p to 60i. FIG. 14 conceptually illustrates a video that has been converted from 24p to 60i using another method, the 2:2:2:4 pull-down method.

As shown in FIG. 14, the set of video frames 1400 includes the first eleven frames of a video after the video 900 of FIG. 9 has been converted from 24p to 60i using the 2:2:2:4 pull-down method. As shown, the set of video frames 1400 includes Frame 0 to Frame 10. Each frame is shown to include the top and bottom fields that correspond to the top and bottom fields of the video 900 of FIG. 9. The figure also shows that the video 1400 plays 10 frames within ⅓ of a second. Thus, the video 1400 plays one more frame every ⅙ of a second than the video 900 of FIG. 9.

Unlike the 3:2 pull-down method and the 2:3:3:2 advanced pull-down method, the 2:2:2:4 pull-down method converts the video from 24p to 60i by repeating a frame every ⅙ of a second. In other words, the 2:2:2:4 pull-down method converts the video by repeating a frame in every 4 frames. As a result, Frame 0 of the video includes top field $A_1$ and bottom field $A_2$, Frame 1 includes top field $B_1$ and bottom field $B_2$, Frame 2 includes top field $C_1$ and bottom field $C_2$, Frame 3 includes top of $D_1$ and bottom field $D_2$, Frame 4 includes repeated top field of $D_1$ and repeated bottom field of $D_2$, Frame 5 includes top field $E_1$ and bottom field $E_2$, Frame 6 includes top field $F_1$ and bottom field $F_2$, Frame 7 includes top field $G_1$ and bottom field $G_2$, Frame 8 includes top field $H_1$ and bottom field $H_2$, and Frame 9 includes repeated top field $H_1$ and repeated bottom field $H_2$. Finally, Frame 10 begins a new cycle that includes the top and bottom fields of the next frame. Every video that has been converted from 24 frames per second to 60 fields per second using the 2:2:2:4 pull-down method will have the pattern as illustrated in FIG. 14.

Different embodiments provide different ways to detect whether a video has been converted using the 2:2:2:4 pull-down method. One approach to detect whether a video has been converted from 24p to 60i using the 2:2:2:4 pull-down method is by determining whether such a pattern exists in the video. The existence of such a pattern can be determined by computing a frame difference value between each pair of consecutive frames within a group of frames and comparing those values. In some embodiments, the group of video frames is in the display order of the video. Furthermore, in some embodiments, each pair of consecutive frames within the group has one overlapping frame with each of the adjacent pairs of consecutive frames. For example, the following conditions can determine whether the frame pattern created by the 2:2:2:4 pull down method exists within a group of 11 frames: (1) identifying the two pairs of consecutive frames that have the smallest frame difference values. In some embodiments, it is also determined that the identified two pairs of consecutive frames do not overlap with each other. (2) There are five pairs of consecutive frames between the identified two pairs of consecutive frames that have the smallest frame difference values (alternatively, this may also be characterized by having three different frames (e.g., Frames E-G) between the two pairs of frames) and (3) the second smallest frame difference value is smaller than the third smallest frame difference value by a predetermined threshold. The first condition detects whether a frame is repeated in every 4 frames. The second condition ensures that the pattern is not mistakenly detected due to other circumstances (e.g., a still scene in a video).

The above comparisons only illustrate one way of detecting the existence of the field pattern, other embodiments may perform different series of comparisons to make the same detection.

Figure 15:
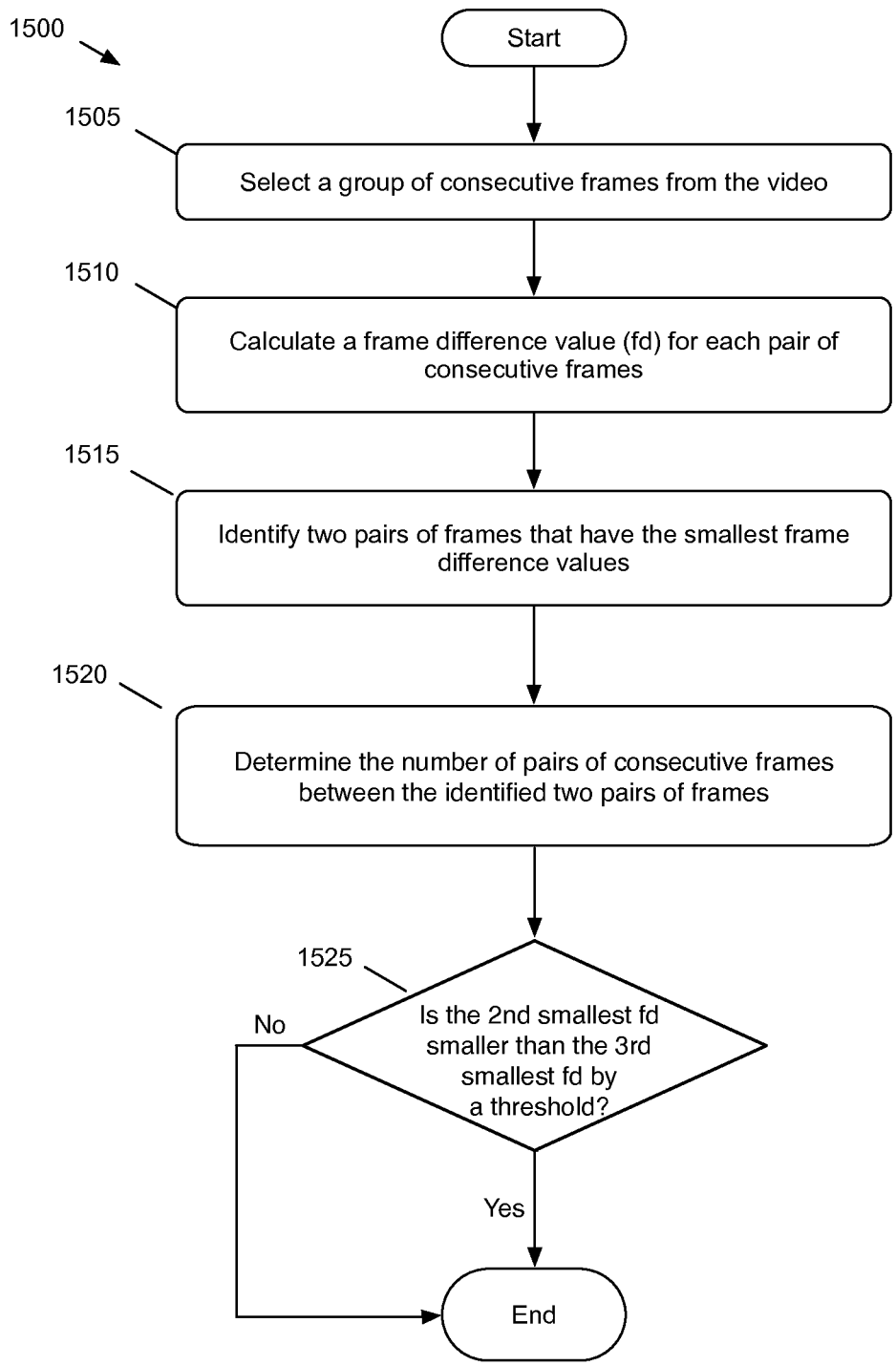
FIG. 15 illustrates a process of some embodiments for detecting whether the video has been converted from 24p to 60i using the 2:2:2:4 pull-down method or converted from 24p to 25p using the 24@25 repeat method.

FIG. 15 conceptually illustrates a process 1500 for using the approach described above to detect whether a video has been converted from 24p to 60i using the 2:2:2:4 pull-down method. Some embodiments perform this process after the video is identified to have a frame rate and format of 60i. As shown, the process 1500 begins by selecting (at 1505) a group of consecutive frames from the video. For the detection of a 2:2:2:4 pull-down method, some embodiments select a group of 11 consecutive frames from the video. In some embodiments, the group of video frames is in the display order of the video. The process then calculates (at 1510) a frame difference value for each pair of consecutive frames. Furthermore, in some embodiments, each pair of consecutive frames within the group has one overlapping frame with each of the adjacent pairs of consecutive frames. Next, the process identifies (at 1515) the two pairs of consecutive frames that have the smallest frame difference values. In some embodiments, the process also determines that the identified two pairs of consecutive frames do not overlap with each other. The process next determines (at 1520) the number of pairs of consecutive frames between the identified two pairs of frames within the group. The process then determines (at 1525) whether the second smallest frame difference value is smaller than the third smallest frame difference value by a threshold. In some embodiments, the threshold is determined based on empirical data. The process then ends.

Some embodiments conclude that the pattern exists if (i) there are 5 pairs of consecutive frames (or alternatively, 3 different frames) between the two pairs of frames having the smallest frame difference values and (ii) the second smallest frame difference value is smaller than the third smallest frame difference value by the threshold.

F. Detecting a Conversion from 24p to 25p Using a 24@25 Repeat Method

Figure 16:
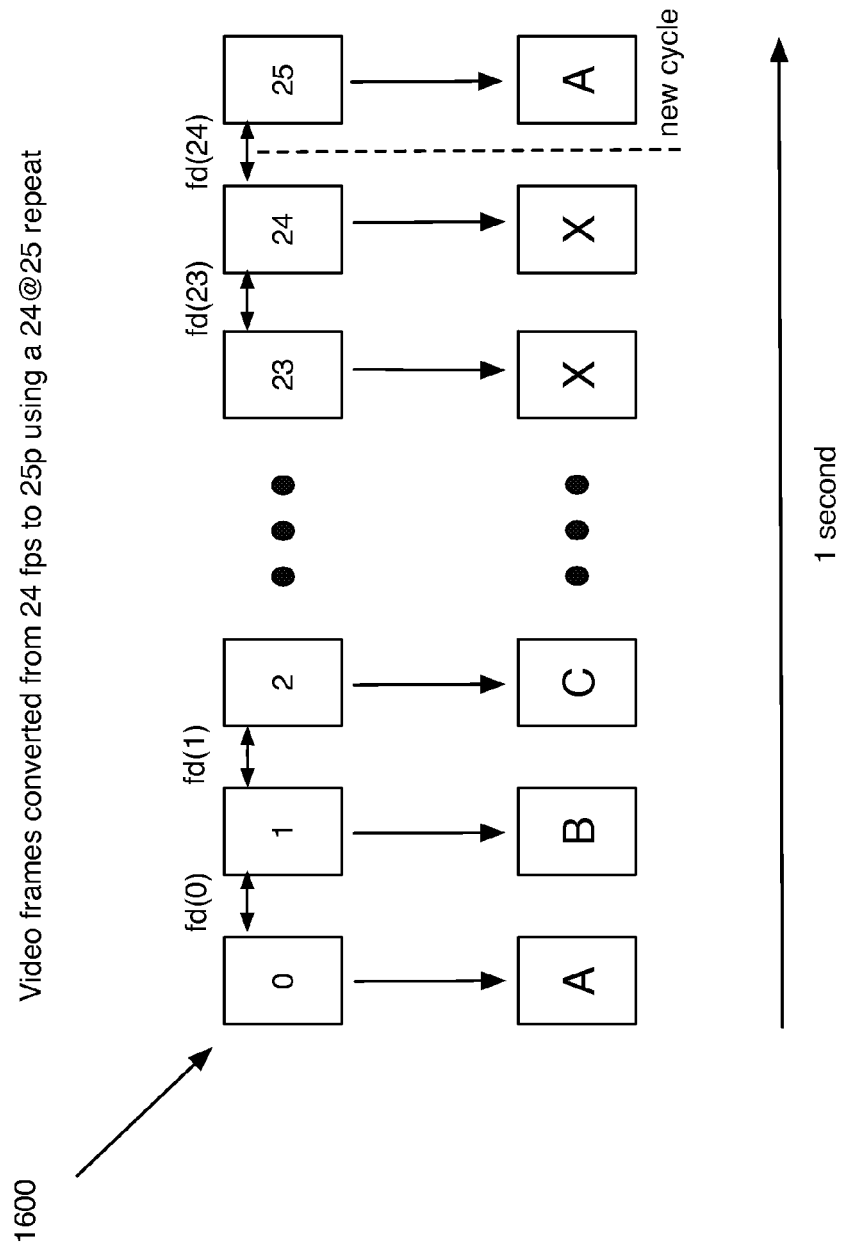
FIG. 16 illustrates an example of a video that has been converted from 24p to 25p using the 24@25 repeat method.

FIGS. 10, 12, and 14 illustrates videos that have been converted from 24p to 60i using different frame rate conversion methods. FIG. 16 conceptually illustrates a video that has been converted from 24p to a progressive format having 25 frames per second (25p) using a 24@25 repeat method.

As shown in FIG. 16, the set of video frames 1600 includes the first twenty-six frames of a video after the video 900 of FIG. 9 has been converted from 24p to 25p using the 24@25 repeat method. As shown, the set of video frames 1600 includes Frame 0 to Frame 25. The figure also shows the corresponding frame from the video 900 of FIG. 9 for each frame in the video 1600. As shown in the figure, the video 1600 plays 25 frames within a second. Thus, the video 1600 plays one more frame every second than the video 900 of FIG. 9.

The 24@25 repeat method converts the video from 24p to 25p by repeating a frame every second. In other words, the 24@25 repeat method converts the video by repeating a frame in every 24 frames. As a result, the first twenty four frames of the video 1600 (Frames 0 to 23) are same as the first twenty four frames of the video 900 of FIG. 9, and Frame 24 of the video 1600 is a repeat of Frame 23. Frame 25 begins a new cycle and includes a new frame from the video 900 of FIG. 9. Every video that has been converted from 24p to 25p using the 24@25 repeat method will have the frame pattern as illustrated in FIG. 16.

Different embodiments provide different ways to detect whether a video has been converted using the 24@25 repeat method. One approach to detect whether a video has been converted from 24p to 25p using the 24@25 repeat method is by determining whether such a pattern exists in the video. The existence of the pattern can be determined by computing a frame difference value between each pair of consecutive frames within a group of frames and comparing those values. In some embodiments, the group of video frames is in the display order of the video. Furthermore, in some embodiments, each pair of consecutive frames within the group has one overlapping frame with each of the adjacent pairs of consecutive frames. For example, the following conditions can determine whether the frame pattern created by the 24@25 method exists within a group of 50 frames: (1) identifying the two pairs of consecutive frames that have the smallest frame difference values. In some embodiments, it is also determined that the identified two pairs of consecutive frames do not overlap with each other. (2) There are 25 pairs of consecutive frames between the two pairs of frames that have the smallest frame difference values (alternatively, this may also be characterized as having 23 different frames (i.e., Frames A-W) between the two pairs of frames) and (3) the second smallest frame difference value is smaller than the third smallest frame difference value by a predetermined threshold. The first condition detects whether a frame is repeated in every 24 frames. The second condition ensures that the pattern is not mistakenly detected due to other circumstances (e.g., a still scene in a video).

The above comparisons only illustrate one way of detecting the existence of the field pattern, other embodiments may perform different series of comparisons to make the same detection.

The process 1500 illustrated in FIG. 15 may also be used to detect whether a video has been converted from 24p to 25p using the 24@25 repeat method. Referring to FIG. 15, the process 1500 begins by selecting (at 1505) a group of consecutive frames from the video. In some embodiments, the group of video frames is in the display order of the video. For the detection of a 24@25 repeat method, some embodiments select a group of 50 consecutive frames from the video. The process then calculates (at 1510) a frame difference value for each pair of consecutive frames. Furthermore, in some embodiments, each pair of consecutive frames within the group has one overlapping frame with each of the adjacent pairs of consecutive frames. Next, the process identifies (at 1515) the two pairs of consecutive frames that have the smallest frame difference values. In some embodiments, the process also determines that the identified two pairs of frames do not overlap with each other. The process next determines (at 1520) the number of pairs of consecutive frames between the identified two pairs of frames. The process then determines (at 1525) whether the second smallest frame difference value is smaller than the third smallest frame difference value by a threshold. In some embodiments, the threshold is determined based on empirical data. The process then ends.

Some embodiments conclude that the pattern exists if (i) there are 25 pairs of consecutive frames (or alternatively, 23 different frames) between the two pairs of frames having the smallest frame difference values and (ii) the second smallest frame difference value is smaller than the third smallest frame difference value by the threshold.

G. Detecting a Conversion from 24p to 60p Using a 3:2 Pull-Down Method

Figure 17:
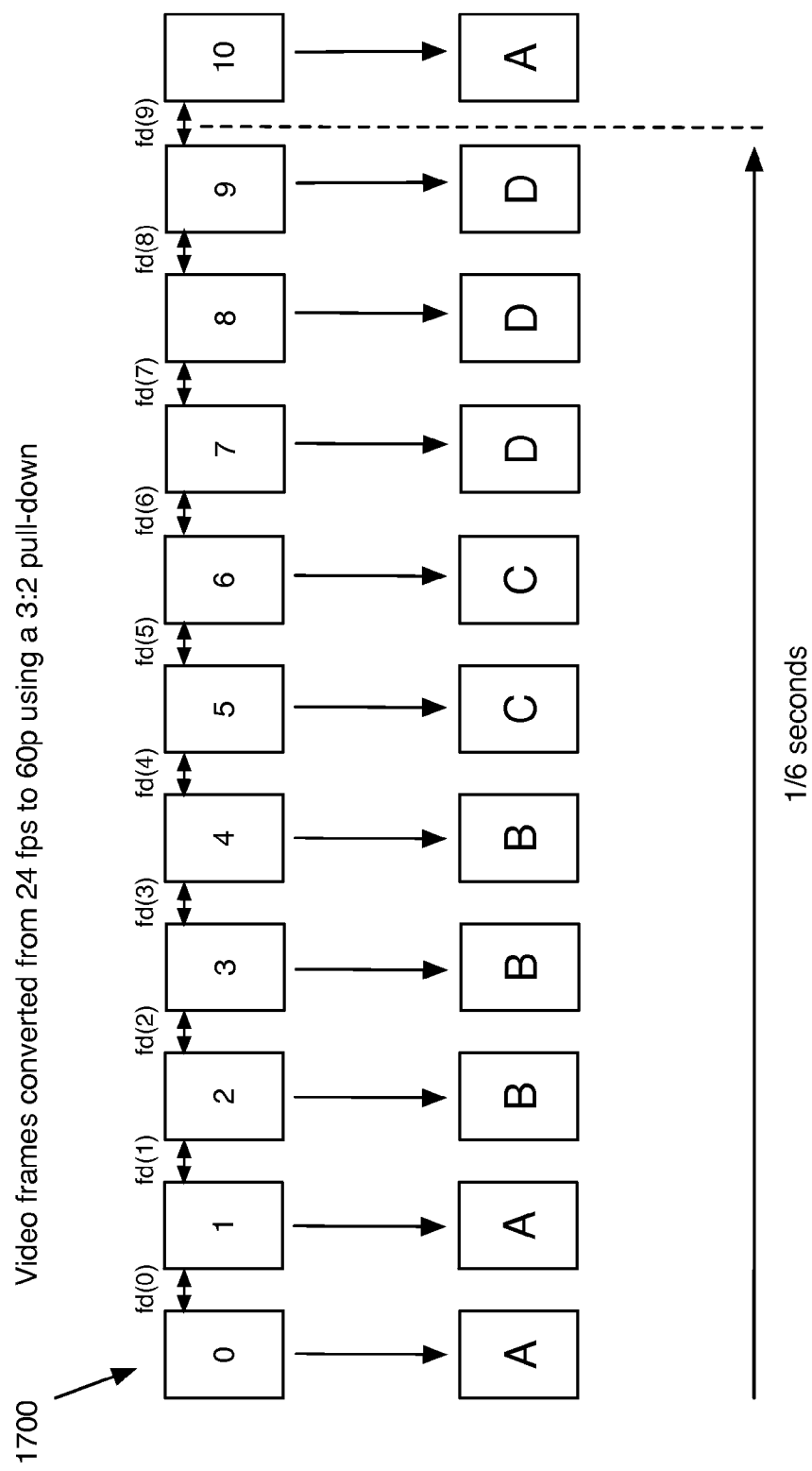
FIG. 17 illustrates an example of a video that has been converted from 24p to 60p using the 3:2 pull-down method.

FIG. 17 conceptually illustrates a video that has been converted from 24p to a progressive format having 60 frames per second (60p) using a 3:2 pull-down method.

As shown in FIG. 17, the set of video frames 1700 includes the first eleven frames of a video after the video 900 of FIG. 9 has been converted from 24p to 60p using the 3:2 pull-down method. The set of video frames 1700 includes Frame 0 to Frame 10. The figure also shows the corresponding frame from the video 900 of FIG. 9 for each frame in the video 1700. As illustrated in the figure, the video 1700 plays 10 frames within ⅙ of a second. Thus, the video 1700 plays six more frames every ⅙ of a second than the video 900 of FIG. 9.

The 3:2 pull-down method converts the video from 24p to 60p by repeating 6 frames every ⅙ of a second. As shown, the 3:2 pull-down method repeats Frame A once in Frame 1, repeats Frame B twice in Frames 3 and 4, repeats Frame C once in Frame 6, and repeats Frame D twice in Frames 8 and 9. As a result, Frames 0 and 1 correspond to Frame A of the video 900 in FIG. 9, Frames 2-4 correspond to Frame B of the video 900 in FIG. 9, Frames 5-6 correspond to Frame C of the video 900 in FIG. 9, and Frames 7-9 correspond to Frame D of the video 900 in FIG. 9. Finally, Frame 10 begins a new cycle of this pattern. Every video that has been converted from 24p to 60p using the 3:2 pull-down method will have the frame pattern as illustrated in FIG. 17.

Different embodiments provide different ways to detect whether a video has been converted from 24p to 60p using the 3:2 pull-down method. One approach is by determining whether such a frame pattern exists in the video. The existence of the field pattern can be determined by computing a frame difference between each pair of consecutive frames within a group of frames and comparing those differences. In some embodiments, the group of video frames is in the display order of the video. Furthermore, in some embodiments, each pair of consecutive frames within the group has one overlapping frame with each of the adjacent pairs of consecutive frames. For example, the following conditions can determine whether the frame pattern created by the 3:2 pull down method exists within a group of eleven frames. (1) The frame difference value for Frame 1 and Frame 2 is larger than the frame difference value for Frame 0 and Frame 1 (i.e., fd(1)>fd(0)). (2) The frame difference value for Frame 1 and Frame 2 is larger than the frame difference value for Frame 2 and Frame 3 (i.e., fd(1)>fd(2)). (3) The frame difference value for Frame 1 and Frame 2 is larger than the frame difference value for Frame 3 and Frame 4 (i.e., fd(1)>fd(3)). (4) The frame difference value for Frame 4 and Frame 5 is larger than the frame difference value for Frame 2 and Frame 3 (i.e., fd(4)>fd(2)). (5) The frame difference value for Frame 4 and Frame 5 is larger than the frame difference value for Frame 3 and Frame 4 (i.e., fd(4)>fd(3)). (6) The frame difference value for Frame 4 and Frame 5 is larger than the frame difference value for Frame 5 and Frame 6 (i.e., fd(4)>fd(5)). (7) The frame difference value for Frame 6 and Frame 7 is larger than the frame difference value for Frame 5 and Frame 6 (i.e., fd(6)>fd(5)). (8) The frame difference value for Frame 6 and Frame 7 is larger than the frame difference value for Frame 7 and Frame 8 (i.e., fd(6)>fd(7)). (9) The frame difference value for Frame 6 and Frame 7 is larger than the frame difference value for Frame 8 and Frame 9 (i.e., fd(6)>fd(8)). (10) The frame difference value for Frame 9 and Frame 10 is larger than the frame difference value for Frame 7 and Frame 8 (i.e., fd(9)>fd(7)). Finally, (11) The frame difference value for Frame 9 and Frame 10 is larger than the frame difference value for Frame 8 and Frame 9 (i.e., fd(9)>fd(8)).

The above comparisons only illustrate one way of detecting the existence of the frame pattern, other embodiments may perform different series of comparisons to make the same detection. Furthermore, to account for changes to pixel values introduced during encoding of the video and/or other processing, some embodiments of the invention may conclude that the pattern exists even if a number of the conditions are not met. For example, some embodiments may declare that the pattern exists if all but one or two conditions are met. The number of the conditions that are allowed to fail may be determined by empirical data.

Figure 18:
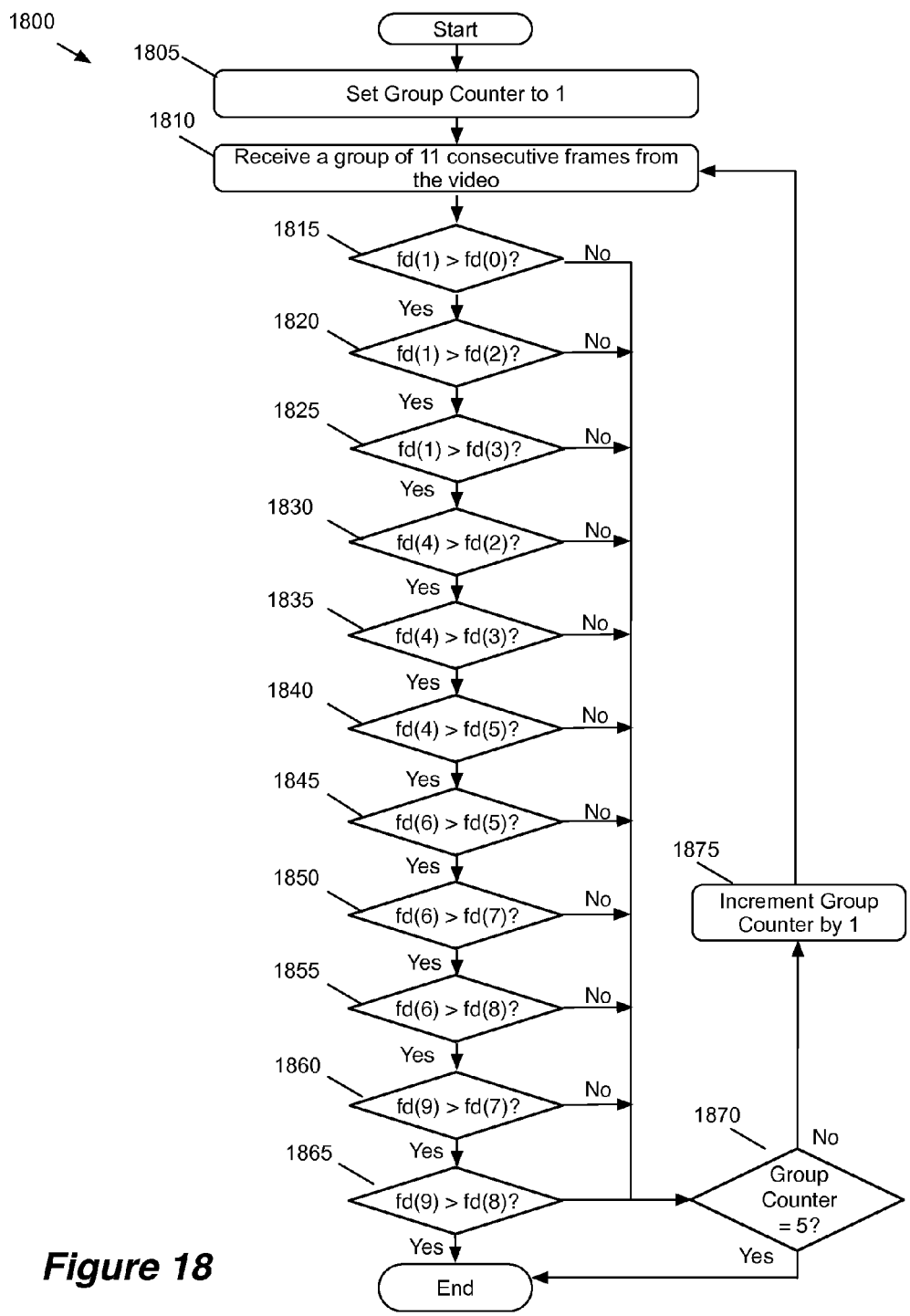
FIG. 18 illustrates a process of some embodiments for detecting whether the video has been converted from 24p to 60p using the 3:2 pull-down method.

FIG. 18 conceptually illustrates a process 1800 for using the approach described above to detect whether a video has been converted from 24p to 60p using the 3:2 pull-down method. As shown, the process 1800 begins by setting (at 1805) a variable, Group Counter, to 1. Next, the process selects (at 1810) a group of 11 consecutive frames from the video. In some embodiments, the group of video frames is in the display order of the video. The process then determines (at 1815) whether fd(1) is larger than fd(0). If the process determines that fd(1) is not larger than fd(0), the process goes to 1870 and determines (at 1870) whether Group Counter has a value of 5. If the process determines that Group Counter has a value of 5, the process ends. If the process determines that Group Counter does not have a value of 5, the process increments (at 1875) the Group Counter by 1 and returns to 1810 to select another group of 11 consecutive frames from the video. Some embodiments select another group of 11 frames by shifting the last group of frames by one (i.e., moving from Frames 0-10 to Frames 1-11). The process will cycle through 1875-1865 until Group Counter has a value of 5. In some embodiments, the process performs several iterations of the comparisons to several groups of frames because the pattern illustrated in FIG. 17 may begin at any of the first to the eleventh frame of the converted video.

If the process determines that fd(1) is larger than fd(0), the process determines (at 1820) whether fd(1) is larger than fd(2). If the process determines that fd(1) is not larger than fd(2)), the process goes back to 1870 and performs the same determination as described above.

If the process determines that fd(1) is larger than fd(2), the process determines (at 1825) whether fd(1) is larger than fd(3). If the process determines that fd(1) is not larger than fd(3), the process goes back to 1870 and performs the same determination as described above.

If the process determines that fd(1) is larger than fd(3), the process determines (at 1830) whether fd(4) is larger than fd(2). If the process determines that fd(4) is not larger than fd(2), the process goes back to 1870 and performs the same determination as described above.

If the process determines that fd(4) is larger than fd(2), the process determines (at 1835) whether fd(4) is larger than fd(3). If the process determines that fd(4) is not larger than fd(3), the process goes back to 1870 and performs the same determination as described above.

If the process determines that fd(4) is larger than fd(3), the process determines (at 1840) whether fd(4) is larger than fd(5). If the process determines that fd(4) is not larger than fd(5), the process goes back to 1870 and performs the same determination as described above.

If the process determines that fd(4) is larger than fd(5), the process determines (at 1845) whether fd(6) is larger than fd(5). If the process determines that fd(6) is not larger than fd(5), the process goes back to 1870 and performs the same determination as described above.

If the process determines that fd(6) is larger than fd(5), the process determines (at 1850) whether fd(6) is larger than fd(7). If the process determines that fd(6) is not larger than fd(7), the process goes back to 1870 and performs the same determination as described above.

If the process determines that fd(6) is larger than fd(7), the process determines (at 1855) whether fd(6) is larger than fd(8). If the process determines that fd(6) is not larger than fd(8), the process goes back to 1870 and performs the same determination as described above.

If the process determines that fd(6) is larger than fd(8), the process determines (at 1860) whether fd(9) is larger than fd(7). If the process determines that fd(9) is not larger than fd(7), the process goes back to 1870 and performs the same determination as described above.

If the process determines that fd(9) is larger than fd(7), the process determines (at 1865) whether fd(9) is larger than fd(8). If the process determines that fd(9) is not larger than fd(8), the process goes back to 1870 and performs the same determination as described above.

On the other hand, if the process determines that fd(9) is larger than fd(8), some embodiments concludes that the video has been converted from 24p to 60p using the 3:2 pull-down method, and the process ends.

H. Detecting a Conversion from 24p to 50i Using a 24@25 Pull-Down Method

Figure 19:
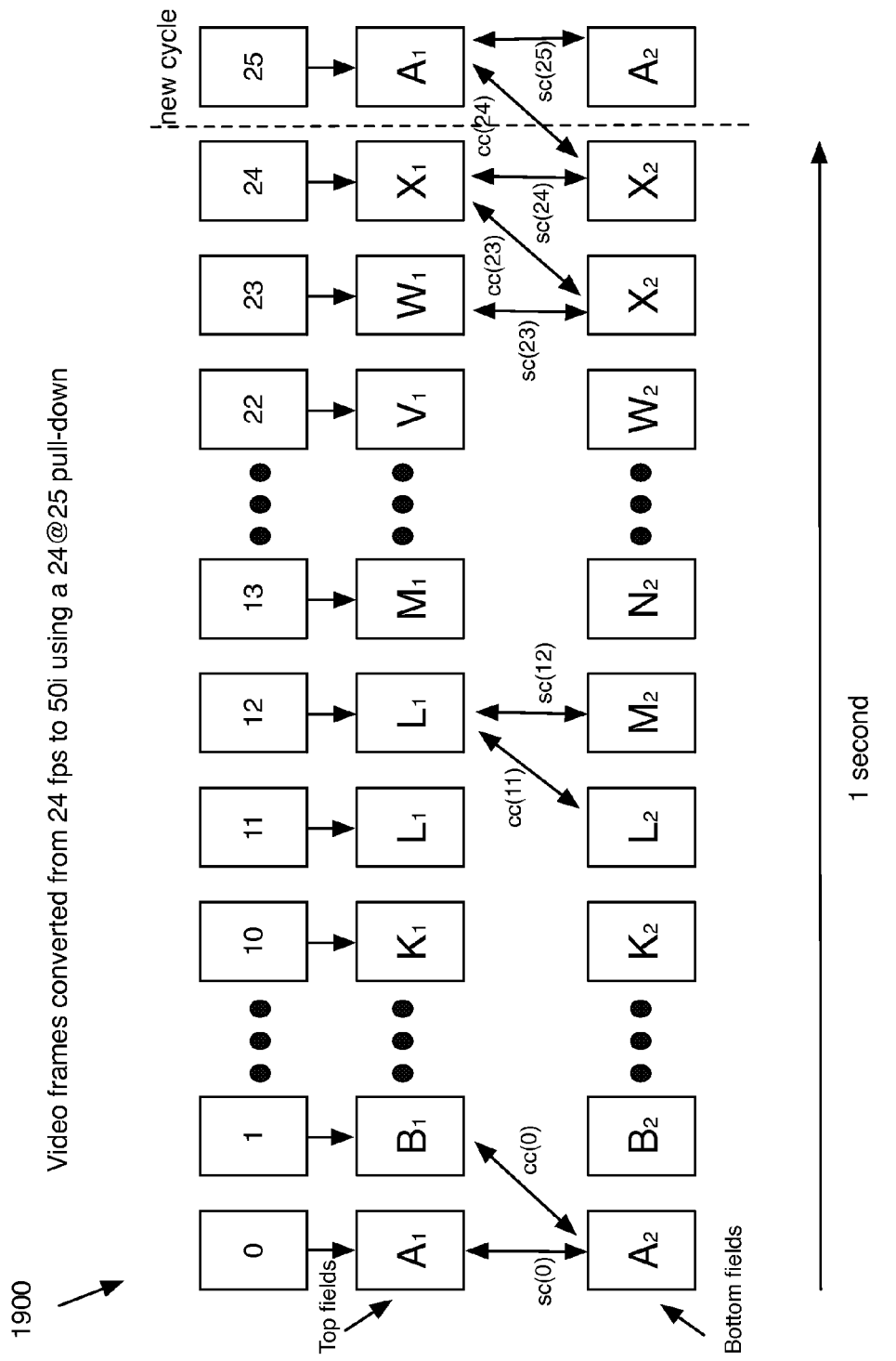
FIG. 19 illustrates an example of a video that has been converted from 24p to 50i using the 24@25 pull-down method.

FIG. 19 illustrates the first twenty-six frames of a video after the video 900 of FIG. 9 has been converted from 24p to an interlaced format having 50 fields per second (50i) using a 24@25 pull-down method. As shown, the set of video frames 1900 includes Frame 0 to Frame 25. Each frame is shown to include the top and bottom fields that correspond to the top and bottom fields of the video 900 of FIG. 9. The figure also shows that the video 1900 plays 25 frames within a second. Thus, the video 1900 plays one more frame every second than the video 900 of FIG. 9.

The 24@25 pull-down method converts the video from 24p to 50i by repeating a top field and a bottom field every second. Specifically, the top field of Frame L, $L_1$, is repeated in Frame 12 and the bottom field of Frame X, $X_2$, is repeated in Frame 24. As shown in the figure, each of the first 12 frames (i.e., Frames 0 to 11) includes top and bottom fields from the same frame of the video 900 of FIG. 9 (e.g., Frame 0 includes the top field $A_1$ and the bottom field $A_2$, Frame 1 includes the top field $B_1$ and the bottom field $B_2$, etc.), each of the next 12 frames (i.e., Frames 12-23) includes top and bottom fields from different frames of the video 900 of FIG. 9 (e.g., Frame 12 includes the top field $L_1$ and the bottom field $M_2$, Frame 13 includes the top field $M_1$ and the bottom field $N_2$, etc.), and Frame 24 includes the top field $X_1$ and the bottom field $X_2$. Finally, Frame 25 begins a new cycle that includes top and bottom fields from the same frame. Every video that has been converted from 24p to 50i using the 24@25 pull-down method will have the field pattern as illustrated in FIG. 19. FIG. 19 shows the field pattern created by the 24@25 pull-down method for a top-field first video. For a bottom-field video, the field pattern will be identical except that the top and bottom fields are switched. Thus, the bottom field of Frame L, $L_2$, is repeated in Frame 12 and the top field of Frame X, $X_1$, is repeated in Frame 24.

In the description that follows, the first field of a frame refers to the top field and the second field of a frame refers to the bottom field when the video is in a top-field first format. Conversely, the first field of a frame refers to the bottom field and the second field of a frame refers to the top field when the video is in a bottom-field first format.

Different embodiments provide different ways to detect whether a video has been converted using the 24@25 pull-down method. One approach to detect whether a video has been converted from 24p to 50i using the 24@25 pull-down method is by determining whether such a field pattern exists within a group of frames. In some embodiments, the existence of the field pattern can be determined by computing self-correlation and cross correlation computation values for different fields within the group of frames and comparing those values. In some embodiments, the group of video frames is in the display order of the video. For example, the following set of conditions can determine whether the field pattern created by a 24@25 pull down method exists within a group of 26 frames. For the first 11 frames (Frames 0 to 10), (1) the self-correlation value for the first and second fields of each frame is smaller than the cross-correlation value for the second field of the frame and the first field of the next frame (i.e., sc(i)<cc(i)) and (2) the self-correlation value for the first and second fields of the next frame is smaller than the cross-correlation value for the second field of the frame and the first field of the next frame (i.e., sc(i+1)<cc(i)).

(3) The cross-correlation value for the second field of Frame 11 and the first field of Frame 12 is smaller than the self-correlation value for the first and second fields of Frame 12 (i.e., cc(11)<sc(12)). To compensate changes to the pixel values caused by encoding of the video, some embodiments also require that cc(11) is smaller than sc(12) by a predetermined threshold (e.g., cc(11)<sc(12)+threshold). Instead of (or in addition to) using a threshold, some embodiments adjusts the value (i.e., increases the value) of sc(12) by a factor before comparing the two values (e.g., cc(1)<sc(2)× factor). In some embodiments, the value of the threshold and the factor are determined through empirical data.

For the next 11 frames (Frames 12 to 22), (4) the cross-correlation value for the second field of each frame and the first field of the next frame is smaller than the self-correlation value for the first and second fields of the frame (i.e., cc(j)<sc(j)) and (5) the cross-correlation value for the second field of the frame and the first field of the next frame is smaller than the self-correlation value for the first and second fields of the next frame (i.e., cc(j)<sc(j+1)). To compensate changes to the pixel values caused by encoding of the video, some embodiments also require that cc(j) is smaller than sc(j) by a factor and cc(j) is smaller than sc(j+1) by a predetermined threshold (e.g., cc(j)<sc(j)+threshold). Instead of (or in addition to)

using a threshold, some embodiments adjusts the value (i.e., increases the value) of sc(j) by a factor before comparing the two values (e.g., cc(j)<sc(j)×factor). In some embodiments, the value of the threshold and the factor are determined through empirical data.

(6) The cross-correlation value for the second field of Frame 23 and the first field of Frame 24 is smaller than the self-correlation value for the first and second fields of Frame 23 (i.e., cc(23)<sc(23)). To compensate changes to the pixel values caused by encoding of the video, some embodiments also require that cc(23) is smaller than sc(23) by a predetermined threshold (e.g., cc(23)<sc(23)+threshold). Instead of (or in addition to) using a threshold, some embodiments adjusts the value (i.e., increases the value) of sc(23) by a factor before comparing the two values (e.g., cc(23)<sc(23)× factor). In some embodiments, the value of the threshold and the factor are determined through empirical data. (7) The self-correlation value for the first and second fields of Frame 24 is smaller than the cross-correlation value for the second field of Frame 24 and the first field of Frame 25 (i.e., sc(24)<cc(24)). Finally, (8) the self-correlation value for the first and second fields of Frame 25 is smaller than the cross-correlation value for the second field of Frame 24 and the first field of Frame 25 (i.e., sc(25)<cc(24)).

In some embodiments, the factors that are used in conditions (3)-(6) are the same factor. In other embodiments, the factors are given different values based on the empirical data.

The above comparisons only illustrate one way of detecting the existence of the field pattern, other embodiments may perform different series of comparisons to make the same detection. Furthermore, to account for changes to pixel values introduced during encoding of the video and/or other processing, some embodiments of the invention may conclude that the pattern exists even if a number of the conditions are not met. For example, some embodiments may declare that the pattern exists if all but one or two conditions are met. The number of the conditions that are allowed to fail may be determined by empirical data.

Figure 20:
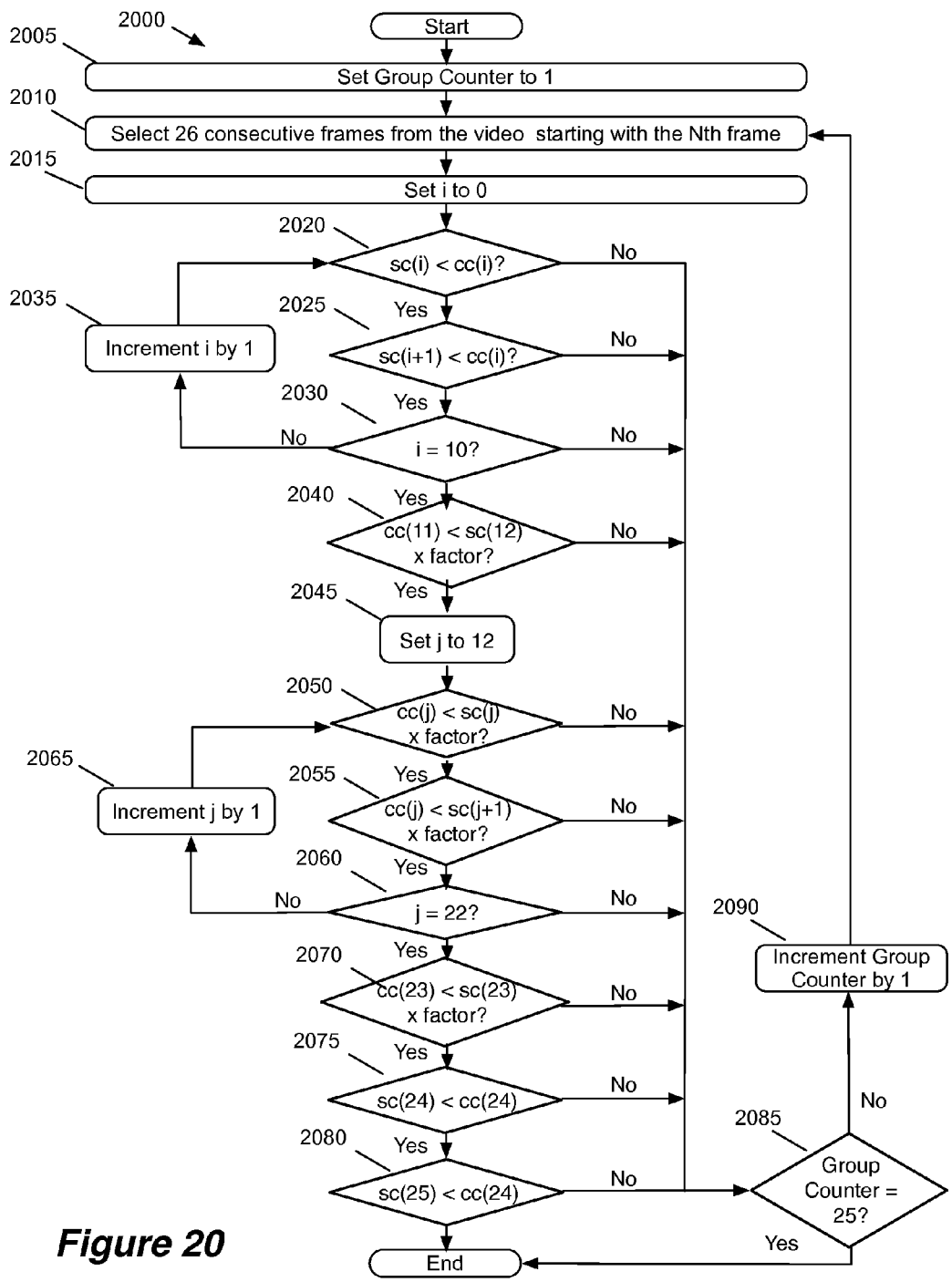
FIG. 20 illustrates a process of some embodiments for detecting whether the video has been converted from 24p to 50i using the 24@25 pull-down method.

FIG. 20 conceptually illustrates a process 2000 for using the approach described above to detect whether a video has been converted using the 24@25 pull-down method. As shown, the process 2000 begins by setting (at 2005) a variable, Group Counter, to 1. Next, the process selects (at 2010) a group of 26 consecutive frames from the video. In some embodiments, the group of video frames is in the display order of the video. The process then sets (at 2015) another variable, i, to 0. The process next determines (at 2020) whether sc(i) is smaller than cc(i). If the process determines that sc(i) is not smaller than cc(i), the process goes to 2085 and determines (at 2085) whether Group Counter has a value of 25. If the process determines that Group Counter has a value of 25, the process ends. If the process determines that Group Counter does not have a value of 25, the process increments (at 2090) the Group Counter by 1 and returns to 2010 to select another group of 26 consecutive frames from the video. Some embodiments select another group of 26 frames by shifting the last group of frames by one (e.g., moving from Frames 0-25 to Frames 1-26). The process will cycle through 2090-2080 until Group Counter has a value of 25. In some embodiments, the process performs several iterations of the comparisons to several groups of frames because the pattern illustrated in FIG. 19 may begin at any of the first through eleventh frame of the converted video.

If the process determines that sc(i) is smaller than cc(i), the process determines (at 2025) whether sc(i+1) is smaller than cc(i). If the process determines that sc(i+1) is not smaller than cc(i)), the process goes back to 2085 and performs the same determination as described above.

If the process determines that sc(i+1) is smaller than cc(i)), the process determines (at 2030) whether the variable i has a value of 10. If the process determines that i does not have a value of 10, the process increments (at 2035) the value of i by 1, returns to 2020, and will cycle through 2020-2025 until i has a value of 10.

If the process determines that i has a value of 10, the process determines (at 2040) whether cc(11) is smaller than sc(12). As mentioned above, some embodiments apply a threshold or a factor in this comparison to compensate changes to the pixel values caused by encoding of the video. In some embodiments, this step includes adjusting the value of sc(12) before comparing sc(12) with cc(11). Some embodiments of the invention increases the value of sc(12) by multiplying, adding, or dividing the value of sc(12) by a predetermined factor. If the process determines that cc(11) is not smaller than sc(12), the process goes back to 2085 and performs the same determination as described above.

If the process determines that cc(11) is smaller than sc(12), the process sets (at 2045) another variable, j, to 12. Next, the process determines (at 1150) whether cc(j) is smaller than sc(j) by a factor. As mentioned above, some embodiments apply a threshold or a factor in this comparison to compensate changes to the pixel values caused by encoding of the video. In some embodiments, this step includes adjusting the value of sc(j) before comparing sc(j) with cc(j). Some embodiments of the invention increases the value of sc(j) by multiplying, adding, or dividing the value of sc(j) by a predetermined factor. If the process determines that cc(j) is not smaller than sc(j), the process goes back to 2085 and performs the same determination as described above.

If the process determines that cc(j) is smaller than sc(j), the process determines (at 2055) whether cc(j) is smaller than sc(j+1). As mentioned above, some embodiments apply a threshold or a factor in this comparison to compensate changes to the pixel values caused by encoding of the video. In some embodiments, this step includes adjusting the value of sc(j+1) before comparing sc(j+1) with cc(j). Some embodiments of the invention increases the value of sc(j+1) by multiplying, adding, or dividing the value of sc(j+1) by a predetermined factor. If the process determines that cc(j) is not smaller than sc(j+1), the process goes back to 2085 and performs the same determination as described above.

If the process determines that cc(j) is smaller than sc(j+1), the process determines (at 2060) if the variable j has a value of 22. If the process determines that j does not have a value of 22, the process increments (at 2065) the value of j by 1, returns to 2050, and will cycle through 2050-2055 until j has a value of 22.

If the process determines that j has a value of 22, the process determines (at 2070) whether cc(23) is smaller than sc(23). As mentioned above, some embodiments apply a threshold or a factor in this comparison to compensate changes to the pixel values caused by encoding of the video. In some embodiments, this step includes adjusting the value of sc(23) before comparing sc(23) with cc(23). Some embodiments of the invention increases the value of sc(23) by multiplying, adding, or dividing the value of sc(23) by a predetermined factor. If the process determines that cc(23) is not smaller than sc(23), the process goes back to 2085 and performs the same determination as described above.

If the process determines that cc(23) is smaller than sc(23), the process determines (at 2075) whether sc(24) is smaller than cc(24). If the process determines that sc(24) is not smaller than cc(24), the process goes back to 2085 and performs the same determination as described above.

If the process determines that sc(24) is smaller than cc(24), the process determines (at 2080) whether sc(25) is smaller than cc(24). If the process determines that sc(25) is not smaller than cc(24), the process goes back to 2085 and performs the same determination as described above. If the process determines that sc(25) is smaller than cc(24), some embodiments conclude that the field pattern exists in the video, and the process ends.

III. Graphical User Interface (GUI) of the Media-Editing Application

Figure 21:
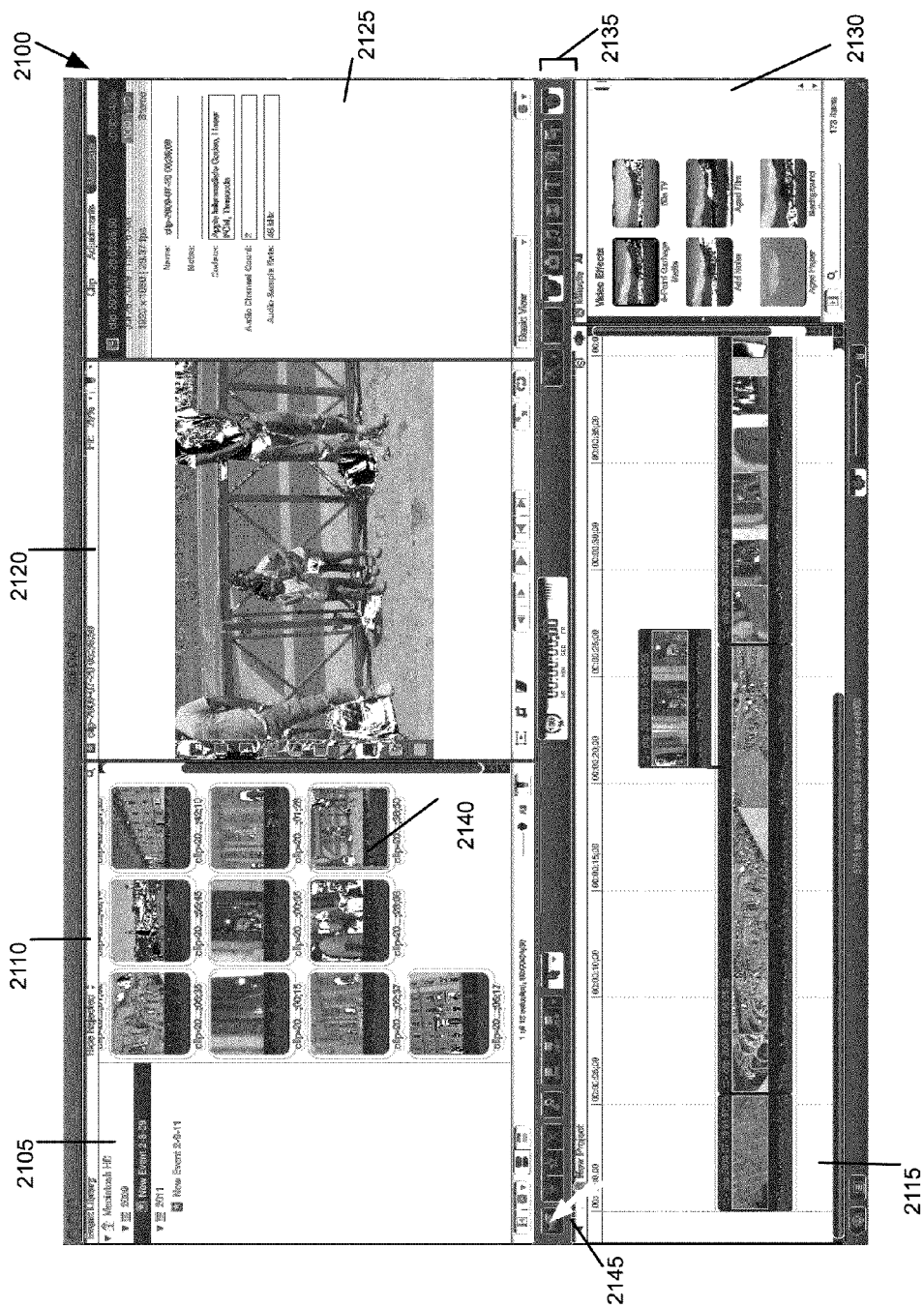
FIG. 21 illustrates a graphical user interface (GUI) of a media-editing application of some embodiments.

FIG. 21 illustrates a graphical user interface (GUI) 2100 of a media-editing application of some embodiments. One of ordinary skill will recognize that the graphical user interface 2100 is only one of many possible GUIs for such a media-editing application. In fact, the GUI 2100 includes several display areas which may be adjusted in size, opened or closed, replaced with other display areas, etc. The GUI 2100 includes a clip library 2105, a clip browser 2110, a timeline 2115, a preview display area 2120, an inspector display area 2125, an additional media display area 2130, and a toolbar 2135.

The clip library 2105 includes a set of folders through which a user accesses media clips that have been imported into the media-editing application. Some embodiments organize the media clips according to the device (e.g., physical storage device such as an internal or external hard drive, virtual storage device such as a hard drive partition, etc.) on which the media represented by the clips are stored. Some embodiments also enable the user to organize the media clips based on the date the media represented by the clips was created (e.g., recorded by a camera). As shown, the clip library 305 includes media clips from both 2009 and 2011.

Within a storage device and/or date, users may group the media clips into "events", or organized folders of media clips. For instance, a user might give the events descriptive names that indicate what media is stored in the event (e.g., the "New Event 2-8-09" event shown in clip library 2105 might be renamed "European Vacation" as a descriptor of the content). In some embodiments, the media files corresponding to these clips are stored in a file storage structure that mirrors the folders shown in the clip library.

Within the clip library, some embodiments enable a user to perform various clip management actions. These clip management actions may include moving clips between events, creating new events, merging two events together, duplicating events (which, in some embodiments, creates a duplicate copy of the media to which the clips in the event correspond), deleting events, etc. In addition, some embodiments allow a user to create sub-folders of an event. These sub-folders may include media clips filtered based on tags (e.g., keyword tags). For instance, in the "New Event 2-8-09" event, all media clips showing children might be tagged by the user with a "kids" keyword, and then these particular media clips could be displayed in a sub-folder of the event that filters clips in this event to only display media clips tagged with the "kids" keyword.

The clip browser 2110 allows the user to view clips from a selected folder (e.g., an event, a sub-folder, etc.) of the clip library 2105. As shown in this example, the folder "New Event 2-8-11 3" is selected in the clip library 2105, and the clips belonging to that folder are displayed in the clip browser 2110. Some embodiments display the clips as thumbnail filmstrips, as shown in this example. By moving a cursor (or a finger on a touchscreen) over one of the thumbnails (e.g., with a mouse, a touchpad, a touchscreen, etc.), the user can skim through the clip. That is, when the user places the cursor at a particular horizontal location within the thumbnail filmstrip, the media-editing application associates that horizontal location with a time in the associated media file, and displays the image from the media file for that time. In addition, the user can command the application to play back the media file in the thumbnail filmstrip.

In addition, the thumbnails for the clips in the browser display an audio waveform underneath the clip that represents the audio of the media file. In some embodiments, as a user skims through or plays back the thumbnail filmstrip, the audio plays as well.

Many of the features of the clip browser are user-modifiable. For instance, in some embodiments, the user can modify one or more of the thumbnail size, the percentage of the thumbnail occupied by the audio waveform, whether audio plays back when the user skims through the media files, etc. In addition, some embodiments enable the user to view the clips in the clip browser in a list view. In this view, the clips are presented as a list (e.g., with clip name, duration, etc.). Some embodiments also display a selected clip from the list in a filmstrip view at the top of the browser so that the user can skim through or playback the selected clip.

The timeline 2115 provides a visual representation of a composite presentation (or project) being created by the user of the media-editing application. Specifically, it displays one or more geometric shapes that represent one or more media clips that are part of the composite presentation. The timeline 2115 of some embodiments includes a primary lane (also called a "spine", "primary compositing lane", or "central compositing lane") as well as one or more secondary lanes (also called "anchor lanes"). The spine represents a primary sequence of media which, in some embodiments, does not have any gaps. The clips in the anchor lanes are anchored to a particular position along the spine (or along a different anchor lane). Anchor lanes may be used for compositing (e.g., removing portions of one video and showing a different video in those portions), B-roll cuts (i.e., cutting away from the primary video to a different video whose clip is in the anchor lane), audio clips, or other composite presentation techniques.

The user can add media clips from the clip browser 2110 into the timeline 2115 in order to add the clip to a presentation represented in the timeline. Within the timeline, the user can perform further edits to the media clips (e.g., move the clips around, split the clips, trim the clips, apply effects to the clips, etc.). The length (i.e., horizontal expanse) of a clip in the timeline is a function of the length of media represented by the clip. As the timeline is broken into increments of time, a media clip occupies a particular length of time in the timeline. As shown, in some embodiments the clips within the timeline are shown as a series of images. The number of images displayed for a clip varies depending on the length of the clip in the timeline, as well as the size of the clips (as the aspect ratio of each image will stay constant).

As with the clips in the clip browser, the user can skim through the timeline or play back the timeline (either a portion of the timeline or the entire timeline). In some embodiments, the playback (or skimming) is not shown in the timeline clips, but rather in the preview display area 2120.

The preview display area 2120 (also referred to as a "viewer") displays images from media files that the user is skimming through, playing back, or editing. These images may be from a composite presentation in the timeline 2115 or from a media clip in the clip browser 2110. In this example, the user has been skimming through the beginning of clip 2140, and therefore an image from the start of this media file is displayed in the preview display area 2120. As shown, some embodiments will display the images as large as possible within the display area while maintaining the aspect ratio of the image.

The inspector display area 2125 displays detailed properties about a selected item and allows a user to modify some or all of these properties. The selected item might be a clip, a composite presentation, an effect, etc. In this case, the clip that is shown in the preview display area 2120 is also selected, and thus the inspector displays information about media clip 2140. This information includes duration, file format, file location, frame rate, date created, audio information, etc. about the selected media clip. In some embodiments, different information is displayed depending on the type of item selected.

The additional media display area 2130 displays various types of additional media, such as video effects, transitions, still images, titles, audio effects, standard audio clips, etc. In some embodiments, the set of effects is represented by a set of selectable UI items, each selectable UI item representing a particular effect. In some embodiments, each selectable UI item also includes a thumbnail image with the particular effect applied. The display area 2130 is currently displaying a set of effects for the user to apply to a clip. In this example, only two effects are shown in the display area (the keyer effect and the luma keyer effect, because the user has typed the word "keyer" into a search box for the effects display area).

The toolbar 2135 includes various selectable items for editing, modifying what is displayed in one or more display areas, etc. The right side of the toolbar includes various selectable items for modifying what type of media is displayed in the additional media display area 2130. The illustrated toolbar 2135 includes items for video effects, visual transitions between media clips, photos, titles, generators and backgrounds, etc. In addition, the toolbar 2155 includes an inspector selectable item that causes the display of the inspector display area 2125 as well as items for applying a retiming operation to a portion of the timeline, adjusting color, and other functions.

The left side of the toolbar 2135 includes selectable items for media management and editing. Selectable items are provided for adding clips from the clip browser 2110 to the timeline 2115. In some embodiments, different selectable items may be used to add a clip to the end of the spine, add a clip at a selected point in the spine (e.g., at the location of a playhead), add an anchored clip at the selected point, perform various trim operations on the media clips in the timeline, etc. The media management tools of some embodiments allow a user to mark selected clips as favorites, among other options.

In addition, the media-editing application includes an import initiation item 2145, which includes a camera icon in this figure. As shown in the figure, when a user holds the cursor over the item 2145, the application displays feedback saying "Import from Camera" in the GUI 2100. As shown, the user is selecting this item with a cursor in FIG. 21. One of ordinary skill will realize that this selection operation, as well as other user interface operations shown with a cursor throughout this application, could be performed with a cursor controller such as a mouse, touchpad, trackpad, etc., can could also be performed through a touchscreen, etc. In addition, while the import process (and other processes in this application) are shown as initiated through various items in the user interface (e.g., item 2145), many of these operations may be initiated in ways other than those shown, such as through drop-down or other menus, keystrokes, etc.

In some embodiments, the frame rate conversion detection process as described by reference to FIG. 3 is initiated upon the selection of the import initiation item 2145. Some embodiments allow a user to manually initiate the frame rate conversion detection process by selecting various items in the GUI 2100 (e.g. through a drop-down or other menus, keystrokes, etc.). After a particular frame rate conversion process method has been detected, some embodiments store the information related to the detected frame rate conversion process in a storage device in association with the imported media. In some embodiments, the media-editing application also displays the information (information of the media's native frame rate and information identifying the frame rate conversion process performed on the media) in the GUI 2100 (e.g., in the inspector display area 2125) when media is selected.

One or ordinary skill will also recognize that the set of display areas shown in the GUI 2100 is one of many possible configurations for the GUI of some embodiments. For instance, in some embodiments, the presence or absence of many of the display areas can be toggled through the GUI (e.g., the inspector display area 2125, additional media display area 2130, and clip library 2105). In addition, some embodiments allow the user to modify the size of the various display areas within the UI. For instance, when the display area 2130 is removed, the timeline 2115 can increase in size to include that area. Similarly, the preview display area 2120 increases in size when the inspector display area 2125 is removed.

IV. Software Architecture

Figure 22:
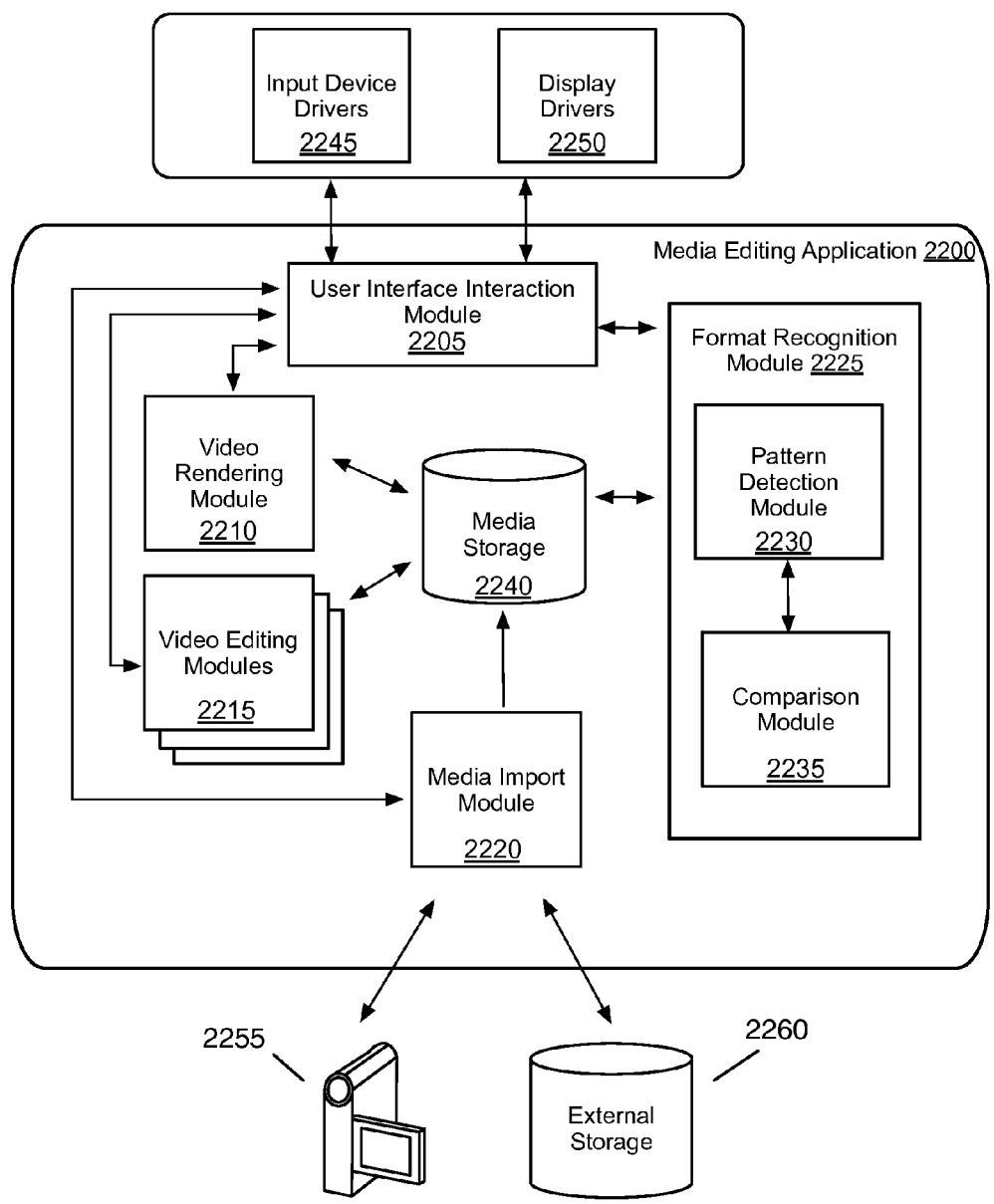
FIG. 22 conceptually illustrates the software architecture of a media-editing application of some embodiments.

In some embodiments, the processes described above are implemented as software running on a particular machine, such as a computer or a handheld device, or stored in a machine readable medium. FIG. 22 conceptually illustrates the software architecture of a media-editing application 2200 of some embodiments. In some embodiments, the media-editing application is a stand-alone application or is integrated into another application, while in other embodiments the application might be implemented within an operating system. Furthermore, in some embodiments, the application is provided as part of a server-based solution. In some such embodiments, the application is provided via a thin client. That is, the application runs on a server while a user interacts with the application via a separate machine remote from the server.

In other such embodiments, the application is provided via a thick client. That is, the application is distributed from the server to the client machine and runs on the client machine.

As shown, the media-editing application 2200 includes a user interface (UI) interaction module 2205, a video rendering module 2210, a set of video editing modules 2215, a media import module 2220, and a format recognition module 2225. The application also includes a media storage 2240. In some embodiments, the media storage 2240 is a set of file folders organized by the media-editing application and stored on a particular set of storage devices. The storage devices may include the boot drive of the electronic device on which the application operates, a different partition of that disk, a separate internal or external hard drive, a flash drive, SD card, etc.

The UI interaction module 2205 of the media-editing application 2200 interprets the user input data received from the input device drivers 2245 and passes it to various modules, including the video editing modules 2215, the media import module 2220, and the format recognition module 2225. In some embodiments, the input data directly affects the composite presentation data or other data stored in the media storage 2240.

The UI interaction module 2205 also manages the display of the UI, and outputs this display information to the display drivers 2250. This UI display information may be based on information from the various modules, including the video editing modules 2215, the video rendering module 2210, the media import module 2220, and the format recognition module 2225.

The media import module 2220 imports media (e.g., a video) into the media-editing application for use in creating a composite presentation. Some embodiments, as shown, receive the media directly from a video capturing device such as a video camera 2255. Some embodiments import media from an external storage 2260. The external storage 2260 may be a an SD card, a flash drive, an external hard drive, an internal hard drive in which the files are not stored in the organized file folder structure of the application, etc.

As shown, the format recognition module 2225 includes a pattern detection module 2230 and comparison module 2235. After a media file is imported into the application, the format recognition module 2225 of some embodiments extracts the frame rate and format information from the media and uses the pattern detection module 2230 and comparison module 2235 to detect any frame rate conversion method that has been used to convert the video from one frame rate and format to another frame rate and format. Specifically, the pattern detection module 2225 detects a particular frame rate conversion method that has been used on the video by detecting any frame/field patterns as described above in the video frames. The pattern detection module 2225 also communicates with the comparison module 2230 for performing the computations of frame differences, self-correlations, and cross-correlations during the detecting process.

V. Electronic System

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

Figure 23:
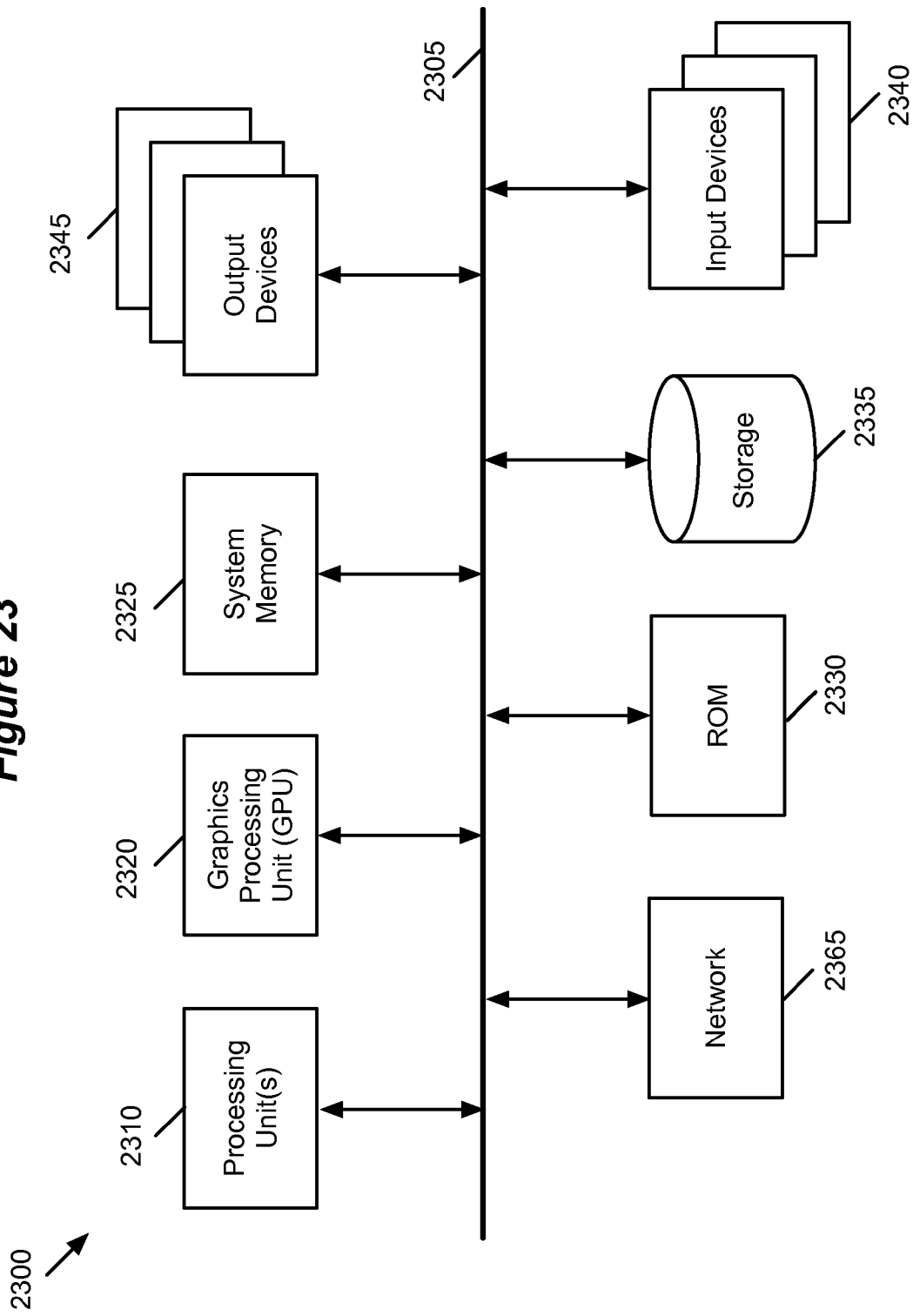
FIG. 23 conceptually illustrates an electronic system 2300 with which some embodiments of the invention are implemented.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs. FIG. 23 conceptually illustrates an electronic system 2300 with which some embodiments of the invention are implemented. The electronic system 2300 may be a computer, phone, PDA, or any other sort of electronic device. Such an electronic system includes various types of computer readable media and interfaces for various other types of computer readable media. Electronic system 2300 includes a bus 2305, processing unit(s) 2310, a graphics processing unit (GPU) 2320, a system memory 2325, a read-only memory 2330, a permanent storage device 2335, input devices 2340, and output devices 2345. The bus 2305 collectively represents all system, peripheral, and chipset buses that communicatively connect the numerous internal devices of the electronic system 2300. For instance, the bus 2305 communicatively connects the processing unit(s) 2310 with the read-only memory 2330, the GPU 2320, the system memory 2325, and the permanent storage device 2335. From these various memory units, the processing unit(s) 2310 retrieve instructions to execute and data to process in order to execute the processes of the invention. The processing unit(s) may be a single processor or a multi-core processor in different embodiments. Some instructions are passed to and executed by the GPU 2320. The GPU 2320 can offload various computations or complement the image processing provided by the processing unit(s) 2310. In some embodiments, such functionality can be provided using CoreImage's kernel shading language. The read-only-memory (ROM) 2330 stores static data and instructions that are needed by the processing unit(s) 2310 and other modules of the electronic system. The permanent storage device 2335, on the other hand, is a read-and-write memory device. This device is a non-volatile memory unit that stores instructions and data even when the electronic system 2300 is off. Some embodiments of the invention use a mass-storage device (such as a magnetic or optical disk and its corresponding disk drive) as the permanent storage device 2335. Other embodiments use a removable storage device (such as a floppy disk, flash drive, or ZIP® disk, and its corresponding disk drive) as the permanent storage device. Like the permanent storage device 2335, the system memory 2325 is a read-and-write memory device. However, unlike storage device 2335, the system memory is a volatile read-and-write memory, such as random access memory. The system memory stores some of the instructions and data that the processor needs at runtime. In some embodiments, the invention's processes are stored in the system memory 2325, the permanent storage device 2335, and/or the read-only memory 2330. For example, the various memory units include instructions for processing multimedia clips in accordance with some embodiments. From these various memory units, the processing unit(s) 2310 retrieve instructions to execute and data to process in order to execute the processes of some embodiments. The bus 2305 also connects to the input and output devices 2340 and 2345. The input devices enable the user to communicate information and select commands to the electronic system. The input devices 2340 include alphanumeric keyboards and pointing devices (also called "cursor control devices"). The output devices 2345 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 23, bus 2305 also couples electronic system 2300 to a network 2365 through a network adapter (not shown). In this manner, the electronic system (e.g., a computer) can be a part of a network of such devices (such as a local area network ("LAN"), a wide area network ("WAN"), or an Intranet, or a network of networks, such as the Internet. Any or all components of electronic system 2300 may be used in conjunction with the invention. Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, a number of the figures (including FIGS. 3, 8, 5, 11, 13, 15, 18, and 20) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process.

What is claimed is:

1. A method of identifying a frame rate conversion process used to generate a video comprising a sequence of frames, each frame comprising first and second fields, the method comprising:
    selecting a group of consecutive frames from the sequence of frames;
    comparing, at a computer, a first correlation score that quantifies a correlation between the second field of a first frame and the first field of a second frame with a second correlation score that quantifies a correlation between the first and second fields of the second frame, the second frame immediately following the first frame in the sequence of frames wherein a correlation score between any pair of first and second fields is computed by: creating an interpolated second field through interpolation using the first field of the pair; comparing the interpolated second field with the second field of the pair; creating an interpolated first field through interpolation using the second field of the pair; and comparing the interpolated first field with the first field of the pair; and based on the comparison, identifying a pattern of repeated fields in the group of frames in order to identify the frame rate conversion process used to generate the video.

2. The method of claim 1, wherein identifying the pattern based on the comparison comprises:
    adjusting the second correlation score by a predetermined factor; and
    determining whether the first correlation score is better than the adjusted second correlation score.

3. The method of claim 2, wherein adjusting the second correlation score comprises multiplying the second correlation score by the predetermined factor.

4. The method of claim 2, wherein adjusting the second correlation score comprises adding the predetermined factor to the second correlation score.

5. The method of claim 1, wherein identifying the pattern based on the comparison comprises determining whether a third correlation score that quantifies a correlation between the second field of the second frame and the first field of a third frame is better than the second correlation score, the third frame immediately following the second frame in the sequence of frames.

6. The method of claim 1, wherein identifying the pattern based on the comparison comprises:
    determining whether a third correlation score that quantifies a correlation between the first and second fields of a third frame is better than a fourth correlation score that quantifies a correlation between the second field of the third frame and the first field of the fourth frame, the third frame apart from the second frame by one frame and the fourth frame immediately following the third frame in the sequence of frames; and
    determining whether a fifth correlation score that quantifies a correlation between the first and second fields of the fourth frame is better than the fourth correlation score.

7. The method of claim 1 further comprising:
    computing a correlation score that quantifies a correlation between the first and second fields of each frame in the group; and
    computing a correlation score that quantifies a correlation between the second field of each frame and the first field of a succeeding frame in the group.

8. The method of claim 1, wherein comparing an interpolated field with a corresponding field comprises comparing each row in the interpolated field with a corresponding row in the corresponding field.

9. The method of claim 1, wherein the pattern is generated by the frame rate conversion process that has been performed on the video while converting the video from a first format to a second format.

10. The method of claim 9, wherein the frame rate conversion process is one of a 3:2 pull-down process for converting the video from 24p to 60i, a 2:3:3:2 advanced pull-down process for converting the video from 24p to 60i, and a 24@25 pull-down process for converting the video from 24p to 50i.

11. A computer readable medium storing a computer program for detecting a pattern in a video comprising a sequence of frames, each frame comprising first and second fields, the computer program executable by at least one processing unit, the computer program comprising sets of instructions for:
    selecting a group of consecutive frames from the sequence of frames;
    comparing a first correlation score that quantifies a correlation between the second field of a first frame and the first field of a second frame with a second correlation score that quantifies a correlation between the first and second fields of the second frame, the second frame immediately following the first frame in the sequence of frames wherein a correlation score between any pair of first and second fields is computed by: creating an interpolated second field through interpolation using the first field of the pair; comparing the interpolated second field with the second field of the pair; creating an interpolated first field through interpolation using the second field of the pair; and comparing the interpolated first field with the first field of the pair; and identifying, based on the comparison, a pattern of repeated fields in the group of frames.

12. The computer readable medium of claim 11, wherein the set of instructions for identifying the pattern based on the comparison comprises sets of instructions for:

adjusting the second correlation score by a predetermined factor; and determining whether the first correlation score is better than the adjusted second correlation score.

13. The computer readable medium of claim 12, wherein the set of instructions for adjusting the second correlation score comprises a set of instructions for multiplying the second correlation score by the predetermined factor.

14. The computer readable medium of claim 11, wherein the set of instructions for identifying the pattern comprises a set of instructions for determining whether a third correlation score that quantifies a correlation between the second field of the second frame and the first field of a third frame is better than the second correlation score, the third frame immediately following the second frame in the sequence of frames.

15. The computer readable medium of claim 11, wherein the computer program further comprises sets of instructions for:

computing a correlation score that quantifies a correlation between the first and second fields of each frame in the group; and computing a correlation score that quantifies a correlation between the second field of each frame and the first field of a succeeding frame in the group.

16. The computer readable medium of claim 11, wherein the set of instructions for comparing an interpolated field with a corresponding field comprises a set of instructions for comparing each row in the interpolated field with a corresponding row in the corresponding field.

17. The computer readable medium of claim 11, wherein the set of instructions for identifying the pattern based on the comparison comprises sets of instructions for:

determining whether a third correlation score that quantifies a correlation between the first and second fields of a third frame is better than a fourth correlation score that quantifies a correlation between the second field of the third frame and the first field of the fourth frame, the third frame apart from the second frame by one frame and the fourth frame immediately following the third frame in the sequence of frames; and determining whether a fifth correlation score that quantifies a correlation between the first and second fields of the fourth frame is better than the fourth correlation score.

18. The computer readable medium of claim 11, wherein the pattern is generated by a frame rate conversion process that has been performed on the video to convert the video from one format to another format.

19. The computer readable medium of claim 18, wherein the frame rate conversion process is one of a 3:2 pull-down process for converting the video from 24p to 60i, a 2:3:3:2 advanced pull-down process for converting the video from 24p to 60i, and a 24@25 pull-down process for converting the video from 24p to 50i.

20. A method for detecting a pattern in a sequence of pictures each picture comprising first and second fields, the method comprising:

computing a first correlation score that quantifies a correlation between a first pair of pictures and a second correlation score that quantifies a correlation between a second pair of pictures wherein a correlation score between any pair of pictures is computed by: creating an interpolated second field through interpolation using the first field of the pair; comparing the interpolated second field with the second field of the pair; creating an interpolated first field through interpolation using the second field of the pair; and comparing the interpolated first field with the first field of the pair;

adjusting the first correlation score to compensate changes to the first pair of pictures caused by an encoding operation; and based on a comparison between the adjusted first correlation score and the second correlation score, identifying, at a computer, a pattern of repeated pictures in the sequence of pictures.

21. The method of claim 20, wherein adjusting the first correlation score comprises multiplying the correlation score by a factor.

22. The method of claim 20, wherein adjusting the first correlation score comprises dividing the first correlation score by a factor.

23. The method of claim 20, wherein the identifying of the pattern is also based on a comparison between the adjusted first correlation score and a third correlation score that quantifies a correlation between a third pair of pictures from the sequence of pictures.

24. The method of claim 20, wherein the first pair of pictures are two fields of a same frame in a video.

* * * * *